United States Patent
Tanaka et al.

(10) Patent No.: US 10,345,014 B2
(45) Date of Patent: Jul. 9, 2019

(54) REFRIGERATION UNIT FOR CONTAINER

(71) Applicant: DAIKIN INDUSTRIES, LTD., Osaka-shi, Osaka (JP)

(72) Inventors: Naohiro Tanaka, Osaka (JP); Atsushi Ozato, Osaka (JP); Makoto Ikemiya, Osaka (JP); Tetsuya Ukon, Osaka (JP); Noritaka Kamei, Osaka (JP); Kazuma Yokohara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 320 days.

(21) Appl. No.: 15/025,028

(22) PCT Filed: Sep. 16, 2014

(86) PCT No.: PCT/JP2014/004761
§ 371 (c)(1),
(2) Date: Mar. 25, 2016

(87) PCT Pub. No.: WO2015/049840
PCT Pub. Date: Apr. 9, 2015

(65) Prior Publication Data
US 2016/0245555 A1     Aug. 25, 2016

(30) Foreign Application Priority Data

Oct. 3, 2013  (JP) ................................ 2013-208519
Mar. 31, 2014  (JP) ................................ 2014-071619

(51) Int. Cl.
*F25B 17/02*     (2006.01)
*A23B 7/04*     (2006.01)
(Continued)

(52) U.S. Cl.
CPC ............ *F25B 17/02* (2013.01); *A23B 7/0425* (2013.01); *B01D 53/047* (2013.01);
(Continued)

(58) Field of Classification Search
CPC ...... A23B 7/0425; A23B 7/152; F25D 11/003; F25D 17/042
See application file for complete search history.

(56) References Cited

U.S. PATENT DOCUMENTS 3,957,463 A * 5/1976 Drissel ................ C01B 13/0259
95/103
4,478,055 A * 10/1984 Drucker .................. F25B 13/00
417/366
(Continued)

FOREIGN PATENT DOCUMENTS

CN     1550203 A     12/2004
DE     219377 A1     3/1985
(Continued)

OTHER PUBLICATIONS

International Search Report, issued in PCT/JP2014/004761, dated Dec. 16, 2014.

*Primary Examiner* — Henry T Crenshaw
(74) *Attorney, Agent, or Firm* — Birch, Stewart, Kolasch & Birch, LLP

(57) ABSTRACT

Disclosed herein a technique for producing a gas mixture for controlling an oxygen concentration in the interior of a container while reducing the overall weight of the apparatus. For this purpose, a gas mixture supply device is provided for a container refrigeration apparatus. The gas mixture supply device is provided with adsorption columns. If one of the first and second adsorption columns is supplied with air, the adsorption columns are pressurized, and nitrogen in the air is adsorbed onto an adsorbent. If air is sucked from the other of the first and second adsorption columns, the adsorption columns are depressurized, and nitrogen adsorbed onto the adsorbent is desorbed. A gas mixture including the nitrogen desorbed from the adsorbent is supplied to the interior of a container.

7 Claims, 29 Drawing Sheets

(51) Int. Cl.
*B01D 53/04* (2006.01)
*B65D 81/26* (2006.01)
*C01B 21/04* (2006.01)
*F25B 49/04* (2006.01)
*F25D 11/00* (2006.01)
*F25D 17/04* (2006.01)
*B01D 53/047* (2006.01)
*A23B 7/152* (2006.01)
*B65D 88/74* (2006.01)

(52) U.S. Cl.
CPC ......... *B65D 81/266* (2013.01); *C01B 21/045* (2013.01); *F25B 49/04* (2013.01); *F25D 11/003* (2013.01); *F25D 17/042* (2013.01); *A23B 7/152* (2013.01); *B01D 53/0407* (2013.01); *B01D 2256/10* (2013.01); *B01D 2257/102* (2013.01); *B01D 2259/402* (2013.01); *B01D 2259/455* (2013.01); *B01D 2259/4525* (2013.01); *B65D 88/745* (2013.01)

(56) References Cited

U.S. PATENT DOCUMENTS

| | | | |
|---|---|---|---|
| 5,051,115 A * | 9/1991 | Leitgeb | B01D 53/0476 95/101 |
| 5,169,413 A * | 12/1992 | Leavitt | B01D 53/0462 95/121 |
| 5,287,704 A * | 2/1994 | Rathbone | F25J 3/0409 62/646 |
| 5,330,857 A * | 7/1994 | Sederquist | C01B 21/0405 205/343 |
| 5,438,841 A | 8/1995 | Cahill-O'Brien et al. | |
| 5,451,248 A * | 9/1995 | Sadkowski | A23B 7/144 426/419 |
| 5,983,779 A * | 11/1999 | Romanco | F04B 53/18 92/128 |
| 2002/0157535 A1* | 10/2002 | Kanazirev | B01D 53/02 95/96 |
| 2006/0086251 A1* | 4/2006 | Sprinkle | B01D 53/047 96/96 |
| 2010/0269525 A1 | 10/2010 | Wang | |
| 2014/0202183 A1* | 7/2014 | Chadwick | A23L 3/3418 62/78 |

FOREIGN PATENT DOCUMENTS

| | | | |
|---|---|---|---|
| JP | H04-207121 | * | 4/1992 |
| JP | H04-207121 A | | 7/1992 |
| JP | H6-254334 | * | 5/1994 |
| JP | 6-254334 A | | 9/1994 |
| JP | 7-31826 A | | 2/1995 |
| JP | 7-313052 A | | 12/1995 |
| JP | 2635534 B2 | | 7/1997 |
| JP | 2003-287360 A | | 10/2003 |
| JP | 2012-229151 A | | 11/2012 |

* cited by examiner

REFRIGERATION UNIT FOR CONTAINER

TECHNICAL FIELD

The present invention relates to a refrigeration unit (apparatus) for container.

BACKGROUND ART

Container refrigeration apparatuses have been used to cool the interior of a container for use in, e.g., marine transportation (see, e.g., Patent Document 1).

The container is loaded with plants such as bananas and avocados. Plants perform respiration by absorbing oxygen in the air and releasing carbon dioxide even after they are harvested. If the oxygen concentration in the container is reduced to a predetermined target concentration as a result of the plant respiration, the respiration rate of the plant decreases. However, since it takes more time to reach such a target concentration, the plants will be discolored, rotten, or deteriorated in other forms in the meantime to have a decreased degree of freshness.

Patent Document 1 discloses a configuration in which the oxygen concentration in a container is quickly reduced by separating nitrogen from the air with a membrane separator to produce nitrogen gas, and supplying such nitrogen gas into the container. As can be seen, if the oxygen concentration of the air in the container is set to be lower than that of the outside air, the respiration rate of the plants may be reduced so much that the degree of freshness can be maintained more easily.

In order to keep the plants fresh, however, it is necessary to properly control not only the oxygen concentration, but also a carbon dioxide concentration, in the container. For example, when the plants are bananas, it is recommended to maintain a nitrogen concentration of 5% and a carbon dioxide concentration of 5% in the container.

Here, in the container, carbon dioxide is generally released as a result of the plant respiration to increase the carbon dioxide concentration in the container. However, the apparatus disclosed in Patent Document 1 supplies the interior of the container with a gas mixture containing 99% of nitrogen and 1% of oxygen. Thus, the plants cannot respire sufficiently, and the carbon dioxide concentration remains low in the container.

Thus, in the apparatus disclosed in Patent Document 1, carbon dioxide bottles are separately provided to supply the interior of a container with carbon dioxide, and control the carbon dioxide concentration in the container.

CITATION LIST

Patent Document

PATENT DOCUMENT 1: Japanese Patent No. 2635534

SUMMARY OF THE INVENTION

Technical Problem

It is known that in a membrane separator, as the flow velocity of the air passing through the membrane separator increases, i.e., as the pressure applied by an air compressor increases, the amount of nitrogen separated by the membrane separator increases so much as to produce nitrogen gas with higher purity.

The apparatus disclosed in Patent Document 1 needs to produce a high-purity nitrogen gas having a nitrogen concentration of more than 99%. Accordingly, it is necessary to set a pressure to be applied by the air compressor to be, e.g., about 827.6 kPa. As a result, a large air compressor needs to be provided, and this eventually causes an increase in the overall weight of the apparatus, which is a problem.

Also, the membrane separator is used to separate nitrogen from the air, and thus, an air heater for heating the air needs to be provided separately. On top of that, a carbon dioxide bottle also needs to be provided separately to increase a carbon dioxide concentration inside the container, and this disadvantageously increases the overall weight of the apparatus.

In view of the foregoing background, it is therefore an object of the present invention to provide a technique for producing a gas mixture for controlling an oxygen concentration in a container while reducing the overall weight of the apparatus.

Solution to the Problem

A first aspect of the present disclosure is directed to a container refrigeration apparatus which includes a refrigerant circuit performing a refrigeration cycle, and which is attached to a container (11) that stores breathing plants (15) to cool air in the interior of the container (11). The container refrigeration apparatus includes: first and second adsorbers (34) and (35) each provided with an adsorbent adsorbing nitrogen in the air; a pressurization portion (31a) which pressurizes one of the first and second adsorbers (34) and (35) by supplying the one adsorber with the air to perform an adsorption operation of adsorbing nitrogen in the air onto the associated adsorbent; a depressurization portion (31b) which depressurizes the other of the first and second adsorbers (34) and (35) by sucking the air from the other adsorber to perform a desorption operation of desorbing nitrogen from the associated adsorbent; switchers (32, 33) which alternately switch between a first operation state where the depressurization portion (31b) sucks the air from the second adsorber (35) while the pressurization portion (31a) supplies the air to the first adsorber (34), and a second operation state where the depressurization portion (31b) sucks the air from the first adsorber (34) while the pressurization portion (31a) supplies the air to the second adsorber (35); and a supplier (44) which supplies the interior of the container (11) with a gas mixture including nitrogen desorbed from the adsorbent.

In the first aspect, if the pressurization portion (31a) pressurizes one of the first and second adsorbers (34) and (35) by supplying the one adsorber with air, nitrogen in the air is adsorbed onto the adsorbent. If the depressurization portion (31b) depressurizes the other of the first and second adsorbers (34) and (35) by sucking the air from the other adsorber, nitrogen is desorbed from the adsorbent. A gas mixture including nitrogen desorbed from the adsorbent is supplied to the interior of the container (11).

The configuration of the first aspect allows for producing a gas mixture to control an oxygen concentration in the interior of the container (11) while reducing the overall weight of the apparatus.

Specifically, in order to produce a high-purity nitrogen gas having a nitrogen concentration of 99% or more in an apparatus with a membrane separator of Patent Document 1, a large air compressor is needed, and an air heater needs to be provided separately. This eventually causes an increase in the overall weight, and the cost, of the apparatus, which is a problem.

In contrast, in the first aspect, a nitrogen-adsorbing adsorbent such as zeolite is used to produce a gas mixture with a high nitrogen concentration. Thus, the pressurization pressure of the pressurization portion (31a) does not have to be as high as in the apparatus disclosed in Patent Document 1, and that pressure may be set to be about 150 kPa, for example. Thus, this also allows for reducing the size of the pressurization portion (31a). Air does not need to be heated in the configuration that uses an adsorbent, and thus, no air heater is needed any longer unlike a conventional apparatus.

Compared to the conventional apparatus, the apparatus of the first aspect needs a depressurization portion (31b) desorbing nitrogen from the adsorbent as an additional member. However, in order to desorb nitrogen from the adsorbent, it is sufficient to reduce the pressure around the adsorbent to, e.g., about −50 kPa. Thus, this also allows for reducing the size of the depressurization portion (31b). That is to say, comparing their overall weight, the apparatus of the first aspect including a small pressurization portion (31a) and a small depressurization portion (31b) may have a lighter weight than the conventional apparatus including a large air compressor.

Also, in the apparatus of Patent Document 1, the plants (15) cannot respire, and thus, a carbon dioxide bottle also needs to be provided separately to increase a carbon dioxide concentration inside the container. This disadvantageously increases the overall weight and cost of the apparatus, which is another problem.

In contrast, in the first aspect, the depressurization portion (31b) sucks air to desorb nitrogen from the adsorbent. The gas mixture with the nitrogen desorbed includes oxygen, which thus allows for supplying a gas mixture in which the plants (15) can respire to the interior of the container (11). On top of that, the plants (15) breathing release carbon dioxide into the container (11). Thus, there is no need to provide any additional carbon dioxide bottle for increasing a carbon dioxide concentration in the container.

Accordingly, the first aspect allows for reducing the overall size of the apparatus, and eventually, reducing not only its weight but also its cost as well, compared to the conventional apparatus.

A second aspect of the present disclosure is an embodiment of the first aspect of the present disclosure. In the second aspect, the container refrigeration apparatus further includes a casing (12) forming an internal storage space (S2) connected to the interior of the container (11), and an external storage space (S1) connected to the exterior of the container (11). The first and second adsorbers (34) and (35), the pressurization portion (31a), and the depressurization portion (31b) are disposed in the external storage space (S1).

In the second aspect, the casing (12) forms the internal storage space (S2) and the external storage space (S1). In the external storage space (S1), the first and second adsorbers (34) and (35), the pressurization portion (31a), and the depressurization portion (31b) are disposed. Thus, even if the container refrigeration apparatus (10) is under operation to keep the temperature in the interior of the container (11) low, maintenance of the first and second adsorbers (34) and (35), the pressurization portion (31a), and the depressurization portion (31b) may be performed.

A third aspect of the present disclosure is an embodiment of the second aspect of the present disclosure. In the third aspect, the container refrigeration apparatus further includes a unit case (70) housing the first and second adsorbers (34) and (35), the pressurization portion (31a), and the depressurization portion (31b).

In the third aspect, the first and second adsorbers (34) and (35), the pressurization portion (31a), and the depressurization portion (31b) are housed in the unit case (70). Thus, the first and second adsorbers (34) and (35), the pressurization portion (31a), and the depressurization portion (31b) are provided as a unit. This makes it easier to install them in the external storage space (S1).

A fourth aspect of the present disclosure is an embodiment of the third aspect of the present disclosure. In the fourth aspect, the container refrigeration apparatus further includes a pump mechanism (31P) including the pressurization portion (31a) and the depressurization portion (31b); and a motor (31M) driving the pump mechanism (31P). At least part of the motor (31M) is disposed outside the unit case (70).

In the fourth aspect, at least part of the motor (31M) driving the pump mechanism (31P) is disposed outside the unit case (70). Thus, at least that part of the motor (31M) is exposed to the outside air, and the motor (31M) may be cooled with the outside air.

A fifth aspect of the present disclosure is an embodiment of the first aspect of the present disclosure. In the fifth aspect, the container refrigeration apparatus further includes a casing (12) forming an internal storage space (S2) connected to the interior of the container (11), and an external storage space (S1) connected to the exterior of the container (11). The pressurization portion (31a) is configured as an air compressor sucking and compressing air, and is disposed in the external storage space (S1). The first and second adsorbers (34) and (35) are disposed in the internal storage space (S2).

In the fifth aspect, the air compressor constituting the pressurization portion (31a) is disposed in the external storage space (S1) of the container (11). This allows for reducing an increase in the interior temperature of the container (11) due to the heat generated by the compression operation of the air compressor, and consequently, the cooling efficiency does not decrease significantly in the interior of the container (11).

In the adsorbent of each of the first and second adsorbers (34) and (35), the lower the ambient temperature is, the higher its adsorptivity becomes. On the other hand, while the container refrigeration apparatus (10) is under operation, the interior temperature of the container (11) is generally lower than the outdoor temperature. Thus, if the first and second adsorbers (34) and (35) are disposed in the internal storage space (S2), the temperature of the adsorbent of each of the first and second adsorbers (34) and (35) may be kept low, and nitrogen in the air may be adsorbed onto the adsorbent easily.

A sixth aspect of the present disclosure is an embodiment of the first aspect of the present disclosure. In the sixth aspect, the container refrigeration apparatus further includes a casing (12) forming an internal storage space (S2) connected to the interior of the container (11), and an external storage space (S1) connected to the exterior of the container (11). The refrigerant circuit (20) includes an evaporator (24) exchanging heat between the air in the interior of the container (11) and a refrigerant to cool the air. The first and second adsorbers (34) and (35) are disposed near the evaporator (24) in the internal storage space (S2).

In the sixth aspect, the inside air is cooled by the refrigerant in the evaporator (24). Thus, the temperature of the air surrounding the evaporator (24) is relatively low. In this aspect, the first and second adsorbers (34) and (35) are disposed near the evaporator (24) in the internal storage space (S2). Thus, this maintains the temperature of the adsorbent low, and improves adsorption performance of the adsorbent. As a result, the adsorbent may adsorb nitrogen in the air more easily.

A seventh aspect of the present disclosure is an embodiment of any one of the first to sixth aspects of the present disclosure. In the seventh aspect, the adsorbent has the property of adsorbing both moisture and nitrogen in air, and the depressurization portion (31b) is configured to suck the air from the first and second adsorbers (34) and (35) to desorb both nitrogen and moisture from the respective adsorbents of the first and second adsorbers (34) and (35).

In the seventh aspect, the adsorbent has the property of adsorbing moisture in the air, and therefore, during the adsorption operation, not only nitrogen but also moisture in the air are adsorbed onto the adsorbent. The moisture adsorbed onto the adsorbent is desorbed, together with nitrogen, from the adsorbent during the desorption operation. As a result, a gas mixture including moisture is supplied to the interior of the container (11). This allows for increasing the humidity in the interior of the container (11). Furthermore, the adsorbent is regenerated, and may have its life extended.

An eighth aspect of the present disclosure is an embodiment of any one of the first to seventh aspects of the present disclosure. In the eighth aspect, the pressurization portion (31a) and the depressurization portion (31b) are configured as oil-less pumps.

In the eighth aspect, the pressurization portion (31a) and the depressurization portion (31b) are configured as oil-less pumps. This allows for overcoming disadvantages occurring when lubricant oil is used for the pumps.

Specifically, suppose that oil is applied to the pump of the pressurization portion (31a). In such a situation, when the compressed air is supplied to the first and second adsorbers (34) and (35) to pressurize them, the oil included in the compressed air is adsorbed onto the adsorbent, resulting in a decrease in the adsorption performance of the adsorbent. On the other hand, if oil is applied to the pump of the depressurization portion (31b), the oil is supplied to the interior of the container (11) together with the gas mixture including nitrogen desorbed from the first and second adsorbers (34) and (35). That is to say, in that case, a gas mixture with an oily odor is supplied to the interior of the container (11) loaded with plants (15).

In contract, in the eighth aspect, the pressurization portion (31a) and the depressurization portion (31b) are configured as oil-less pumps, and thus, the above disadvantage is not caused.

A ninth aspect of the present disclosure is an embodiment of the first or second aspect of the present disclosure. In the ninth aspect, the container refrigeration apparatus further includes: a unit case (70) housing at least the pressurization portion (31a); an intra-case temperature sensor (95) detecting a temperature in the unit case (70); and a controller (55) adjusting a time interval at which the switchers (32, 33) switch between the first and second operation states in accordance with a measured value of the intra-case temperature sensor (95).

For example, during the first operation state, the pressure of the first adsorber (34) gradually increases because the pressurization portion (31a) supplies the air to the first adsorber (34). If the operation states are switched from the first operation state into the second operation state by the switchers (32, 33), the destination of the air supplied from the pressurization portion (31a) changes from the first adsorber (34) to the second adsorber (35), and then, the pressure of the second adsorber (35) gradually rises. As can be seen, the pressure of the air supplied from the pressurization portion (31a) to the adsorbers (34, 35) varies every time a switch is made between the first and second operation states.

As the duration of each of the first and second operation states extends, the pressure of the adsorbers (34, 35) to which the pressurization portion (31a) supplies the air rises, and the temperature of the air supplied from the pressurization portion (31a) to the adsorbers (34, 35) also rises. If the temperature of the air supplied from the pressurization portion (31a) to the adsorbers (34, 35) becomes too high, the temperature of the pressurization portion (31a) also becomes too high to avoid doing damage to the pressurization portion (31a).

In the ninth aspect, the pressurization portion (31a) is housed in the unit case (70). Thus, as the temperature of the air in the unit case (70) increases, the temperature of the pressurization portion (31a) tends to rise. Thus, the controller (55) adjusts the time interval at which the switchers (32, 33) switch between the first and second operation states by in accordance with the measured value of the intra-case temperature sensor (95). For example, if the controller (55) shortens the time interval when the measured value of the intra-case temperature sensor (95) exceeds the reference value, the temperature of the air supplied from the pressurization portion (31a) to the adsorbers (34, 35) may be kept low, and an increase in the temperature of the pressurization portion (31a) may be reduced.

Advantages of the Invention

Various aspects of the present disclosure allow for producing a gas mixture for controlling an oxygen concentration in the interior of the container (11) while reducing the overall weight of the apparatus.

DESCRIPTION OF EMBODIMENTS

Embodiments of the present invention will now be described in detail with reference to the drawings. The following embodiments are merely preferred examples in nature, and are not intended to limit the scope, applications, and use of the invention.

First Embodiment

A first embodiment will now be described. As will be described later, a container refrigeration apparatus (10) according to this embodiment includes a gas mixture supply device (30).

Container Refrigeration Apparatus

Figure 1:
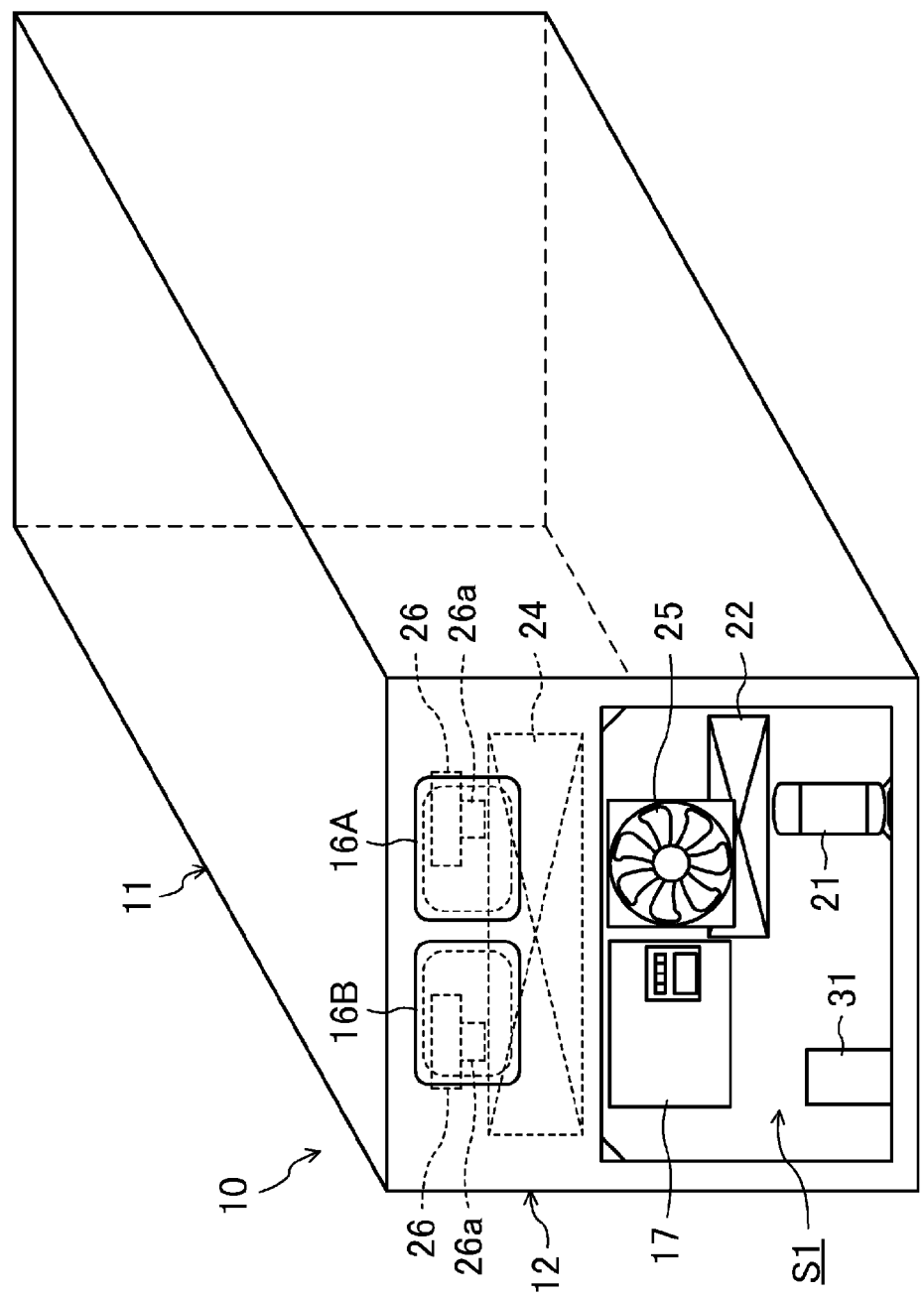
FIG. 1 is a perspective view of a container refrigeration apparatus according to a first embodiment, as viewed from the exterior of the container.
Figure 2:
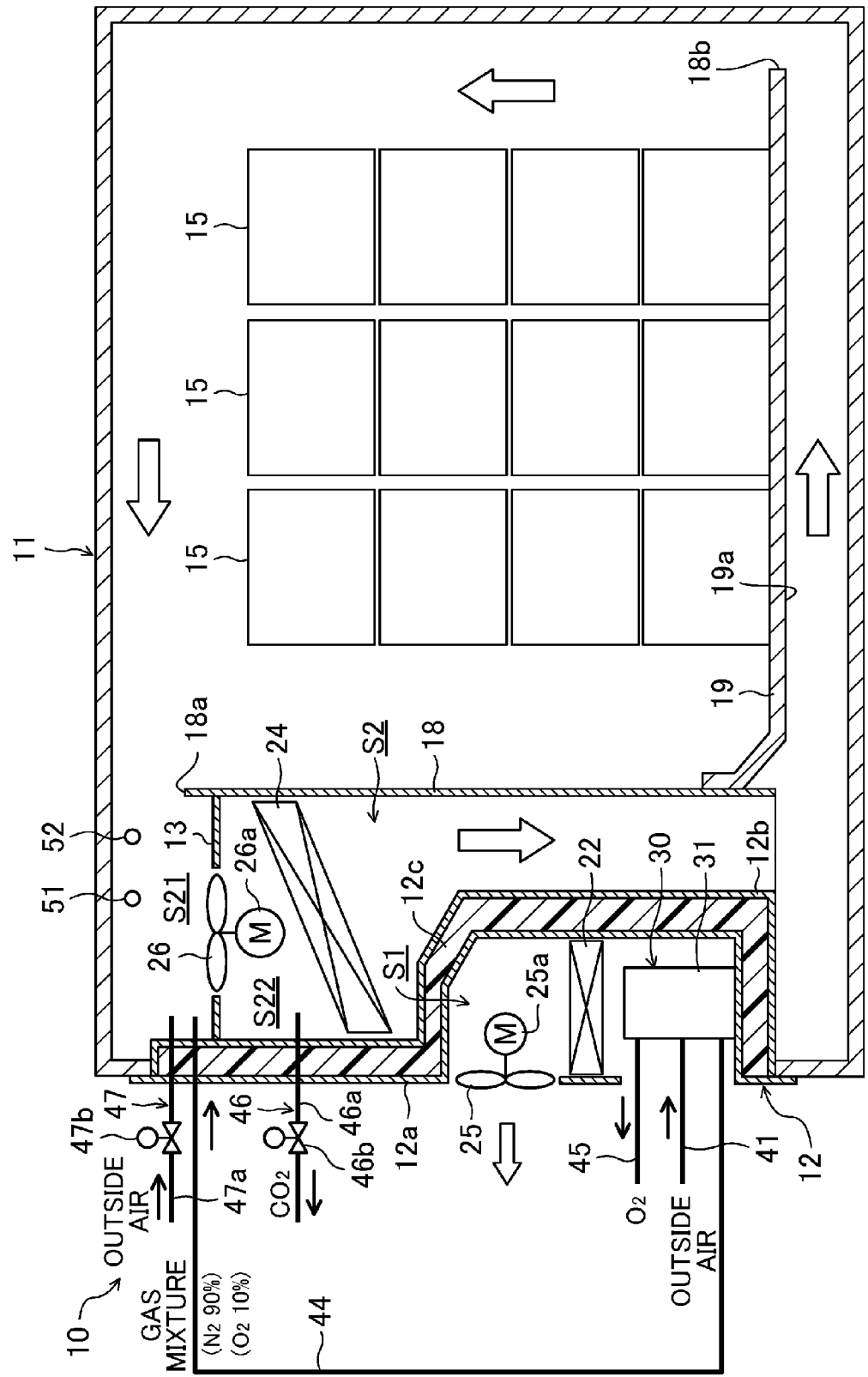
FIG. 2 is a side cross-sectional view illustrating a configuration of the container refrigeration apparatus according to the first embodiment.

As illustrated in FIGS. 1 and 2, the container refrigeration apparatus (10) cools air in the interior of a container (11) for use in e.g., marine transportation. The container refrigeration apparatus (10) includes a refrigerant circuit (20) which performs a refrigeration cycle to cool air in the interior of the container (11) (see FIG. 3). In the interior of the container (11), boxed plants (15) are stored. The plants (15) perform respiration by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) is in the shape of an elongate box with an open end surface. The container refrigeration apparatus (10) is attached so as to close the open end of the container (11). A casing (12) of the container refrigeration apparatus (10) includes an exterior wall (12a) disposed outside the interior of the container (11) and an interior wall (12b) disposed inside the interior of the container (11). The exterior and interior walls (12a) and (12b) may be made of aluminum alloy, for example.

The exterior wall (12a) is attached to the periphery of the opening of the container (11) so as to close the open end of the container (11). The exterior wall (12a) is formed such that the lower part of the exterior wall (12a) protrudes into the interior of the container (11).

The interior wall (12b) is disposed so as to face the exterior wall (12a). The interior wall (12b) protrudes, just like the lower part of the exterior wall (12a), into the interior of the container (11). A thermal insulator (12c) fills the space between the interior and exterior walls (12b, 12a).

The lower part of the casing (12) is formed so as to protrude into the interior of the container (11). Thus, an external storage space (S1) is formed outside the interior of the container (11) and in the lower part of the casing (12), and an internal storage space (S2) is formed inside the interior of the container (11) and in the upper part of the casing (12).

The casing (12) is provided with two access doors (16A, 16B) which are arranged side by side in the width direction of the casing (12), the access doors (16A, 16B) being openable and closable during maintenance. An electrical component box (17) is disposed in the external storage space (S1) of the casing (12) so as to be adjacent to an exterior fan (25) which will be described later.

A partition plate (18) is disposed in the interior of the container (11). This partition plate (18) is formed in the shape of a substantially rectangular plate member, and stands upright so as to face the wall of the casing (12) inside the interior of the container (11). This partition plate (18) separates the internal storage space (S2) from the interior of the container (11).

A suction port (18a) is formed between the upper end of the partition plate (18) and the ceiling surface of the container (11). Air in the interior of the container (11) is taken into the internal storage space (S2) through the suction port (18a).

The internal storage space (S2) is further provided with a partition wall (13) extending in the horizontal direction. The partition wall (13) is attached to the upper end of the partition plate (18), and has an opening in which interior fans (26), which will be described later, are disposed. This partition wall (13) partitions the internal storage space (S2) into a first space (S21) that is the suction side of the interior fan (26), and a second space (S22) that is the blowout side of the interior fan (26).

An oxygen concentration detection sensor (51) detecting an oxygen concentration in the container (11) and a carbon dioxide concentration detection sensor (52) detecting a carbon dioxide concentration in the container (11) are disposed near the suction port (18a) in the container (11).

In the interior of the container (11), a floorboard (19) is disposed with a gap left between the floorboard (19) and the bottom surface of the container (11). On the floorboard (19), boxed plants (15) are mounted. An air flow path (19a) is formed between the floorboard (19) and the bottom surface of the container (11). A gap is also left between the lower end of the partition plate (18) and the bottom surface of the container (11), and communicates with the air flow path (19a).

A blowout port (18b) blowing the air which has been cooled by the container refrigeration apparatus (10) into the interior of the container (11) is provided at an end of the floorboard (19) opposite from the open end of the container (11) (on the right side in FIG. 2). The casing (12) of the container refrigeration apparatus (10) is provided with an intake portion (47) through which the outside air is introduced into the interior of the container (11), and an exhaust portion (46) through which the air in the interior of the container (11) is exhausted out of the container (11). The exhaust portion (46) has an exhaust pipe (46a) connecting the interior and exterior of the container (11) together, and an exhaust valve (46b) connected to the exhaust pipe (46a). The intake portion (47) has an intake pipe (47a) connecting the interior and exterior of the container (11) together, and an intake valve (47b) connected to the intake pipe (47a).

Figure 3:
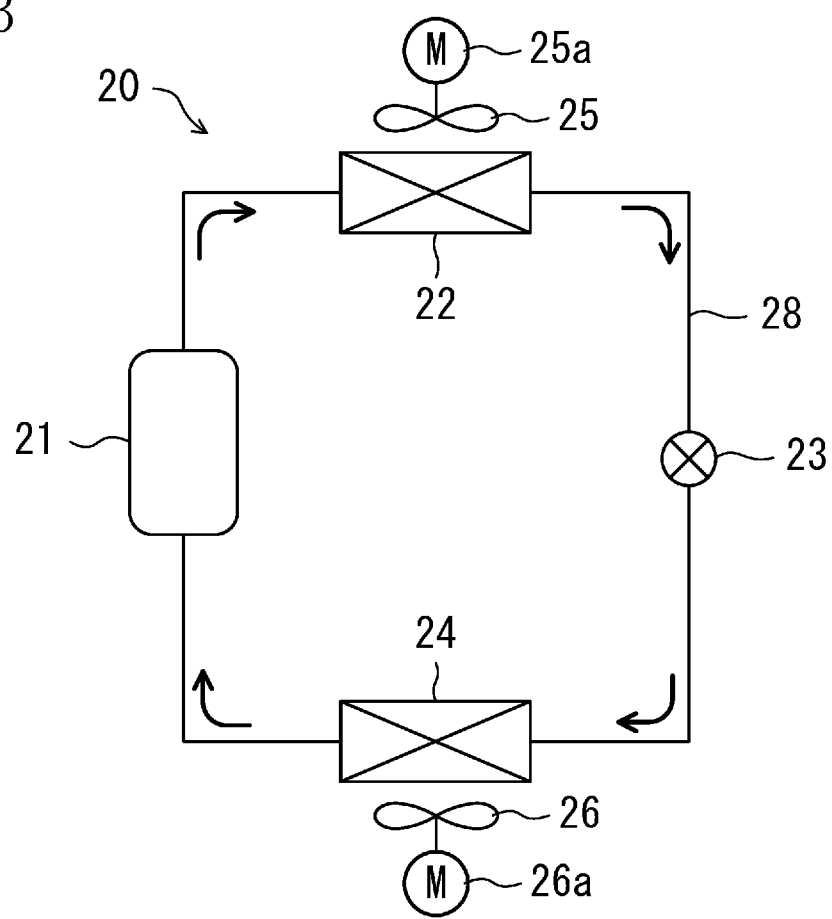
FIG. 3 is a piping system diagram illustrating the configuration of a refrigerant circuit according to the first embodiment.

As illustrated in FIG. 3, the container refrigeration apparatus (10) includes a refrigerant circuit (20) where a refrigerant circulates to perform a vapor compression refrigeration cycle. The refrigerant circuit (20) is a closed circuit in which a compressor (21), a condenser (22), an expansion valve (23), and an evaporator (24) are connected together in this order by refrigerant piping (28).

As illustrated in FIGS. 1 and 2, the compressor (21) and the condenser (22) are housed in the external storage space (S1). The exterior fan (25) is disposed above the condenser (22). The exterior fan (25) is driven in rotation by an exterior fan motor (25a), guides air in the exterior of the container (11) to the external storage space (S1) and sends it to the condenser (22). In the condenser (22), heat is exchanged between a refrigerant flowing through the condenser (22) and the outside air.

The evaporator (24) is housed in the internal storage space (S2). Two interior fans (26) are disposed above the evaporator (24) in the internal storage space (S2) and arranged side by side in the width direction of the casing (12).

The interior fans (26) are driven in rotation by interior fan motors (26a), and guide the air in the interior of the container (11) through the suction port (18a) to blow the air into the evaporator (24). In the evaporator (24), heat is exchanged between a refrigerant flowing through the evaporator (24) and the inside air. The inside air which has dissipated heat to the refrigerant to be cooled when passing through the evaporator (24) passes through the air flow path (19a) and is blown into the container (11) via the blowout port (18b).

Gas Mixture Supply Device

The container refrigeration apparatus (10) includes a gas mixture supply device (30) supplying the interior of the container (11) with a gas mixture with a low oxygen concentration. The gas mixture supply device (30) according to this embodiment produces a gas mixture by vacuum pressure swing adsorption (VPSA) process.

Figure 4:
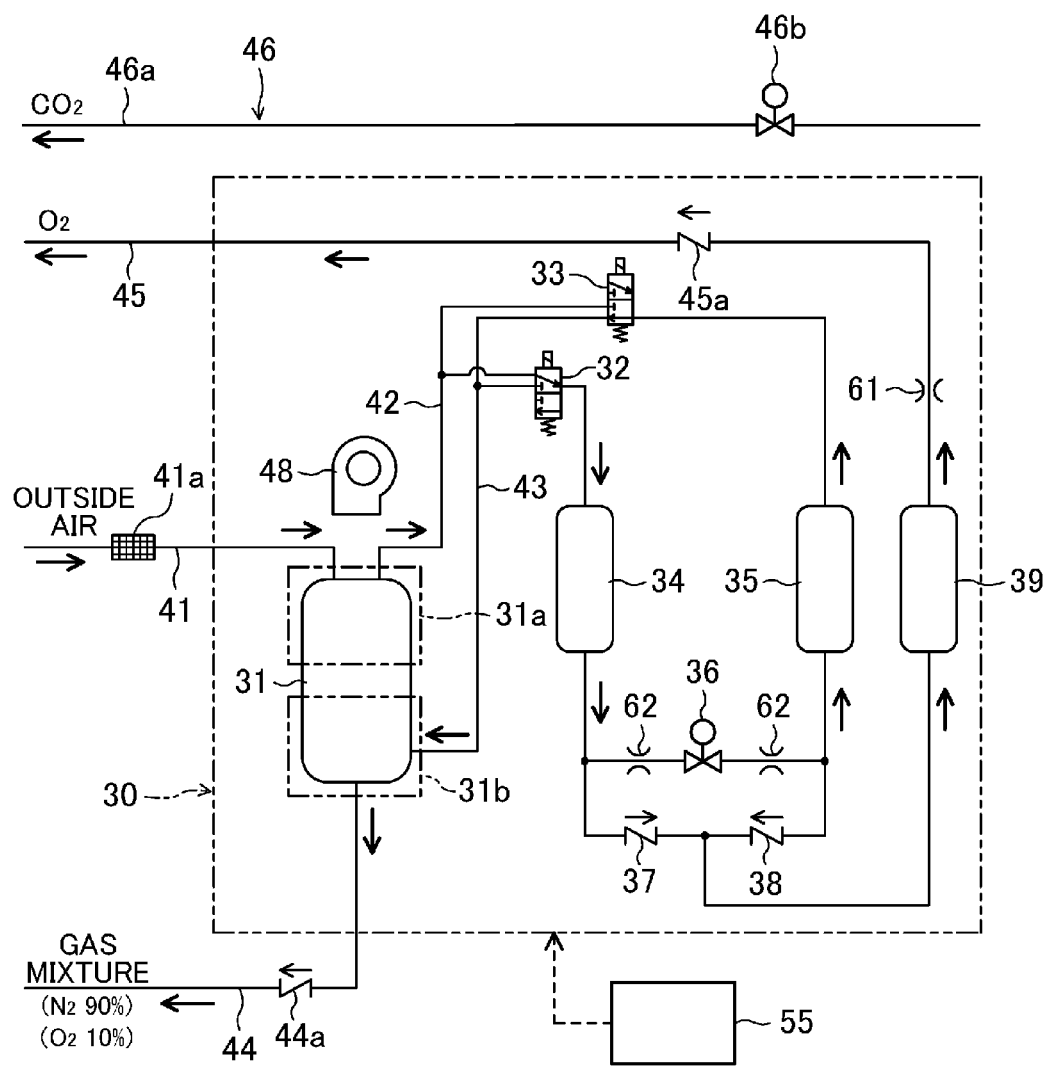
FIG. 4 is a piping system diagram illustrating the configuration of a gas mixture supply device according to the first embodiment.

As illustrated in FIG. 4, the gas mixture supply device (30) includes an air pump (31), first and second directional control valves (32) and (33), first and second adsorption columns (34) and (35) each provided with an adsorbent for adsorbing nitrogen in the air, a purge valve (36), first and second check valves (37) and (38), and an oxygen tank (39).

The air pump (31) is disposed in the external storage space (S1). This air pump (31) includes a pressurization portion (31a) and a depressurization portion (31b).

The pressurization portion (31a) of the air pump (31) sucks outside air through an inflow passage (41) connected to the exterior of the container (11) to compress the air. This pressurization portion (31a) pressurizes the first and second adsorption columns (34) and (35) by supplying the columns (34, 35) with the compressed air through an outflow passage (42) to perform an adsorption operation of adsorbing nitrogen in the air onto the adsorbent. An air filter (41a) is attached to a midway point of the inflow path (41).

The depressurization portion (31b) of the air pump (31) depressurizes the first and second adsorption columns (34) and (35) by sucking the air from the columns (34, 35) through a suction passage (43) to perform a desorption operation of desorbing nitrogen from the adsorbent. It is recommended that the depressurization portion (31b) be configured to reduce the internal pressure of each of the first and second adsorption columns (34) and (35) to a negative pressure (i.e., a pressure lower than the atmospheric pressure) during the desorption operation.

The pressurization portion (31a) and depressurization portion (31b) of the air pump (31) are configured as oil-less pumps without lubricant oil. The pressurization portion (31a) is an air compressor compressing the air sucked to a pressure higher than the atmospheric pressure and discharging it to a destination. The depressurization portion (31b) is an exhaust pump sucking the air from a component connected to this pump and exhausting the air.

Here, suppose that oil is used in the pump of the pressurization portion (31a). In such a situation, when the first and second adsorption columns (34) and (35) are pressurized by being supplied with the compressed air, the oil included in the compressed air is adsorbed onto the adsorbent, resulting in a decrease in the adsorption performance of the adsorbent. On the other hand, if oil is used in the pump of the depressurization portion (31b), the oil is supplied to the interior of the container (11) together with the gas mixture including nitrogen desorbed from the first and second adsorption columns (34) and (35). That is to say, in that case, the gas mixture with oily odor is supplied to the interior of the container (11) loaded with plants (15). Thus, this embodiment allows for overcoming such a disadvantage by implementing the pressurization portion (31a) and depressurization portion (31b) of the air pump (31) as oil-less pumps.

A blower fan (48) is disposed above the air pump (48) to cool the air pump (31) by blowing air to the air pump (31).

The first and second directional control valves (32) and (33) are used to alternately switch the targets of adsorption operation or desorption operation between the first and second adsorption columns (34) and (35).

The first directional control valve (32) is connected to the discharge port of the pressurization portion (31a), the suction port of the depressurization portion (31b), and the top of the first adsorption column (34). This first directional control valve (32) switches between a state where the first adsorption column (34) is allowed to communicate with the pressurization portion (31a) but is shut off from the depressurization portion (31b) (the state illustrated in FIG. 4), and a state where the first adsorption column (34) is allowed to communicate with the depressurization portion (31b) but is shut off from the pressurization portion (31a).

The second directional control valve (33) is connected to the discharge port of the pressurization portion (31a), the suction port of the depressurization portion (31b), and the top of the second adsorption column (35). This second directional control valve (33) switches between a state where the second adsorption column (35) is allowed to communicate with the pressurization portion (31a) but shut off from the depressurization portion (31b), and a state where the second adsorption column (35) is allowed to communicate with the depressurization portion (31b) but shut off from the pressurization portion (31a) (the state illustrated in FIG. 4).

In the state illustrated in FIG. 4, the pressurization portion (31a) performs an adsorption operation on the first adsorption column (34), and the depressurization portion (31b) performs a desorption operation on the second adsorption column (35). If the positions of the first and second directional control valves (32) and (33) are opposite from those in FIG. 4, the pressurization portion (31a) performs an adsorption operation on the second adsorption column (35) and the depressurization portion (31b) performs a desorption operation on the first adsorption column (34) although not illustrated. The gas mixture supply device (30) repeatedly performs the above described process while interchanging the targets of the adsorption and desorption operations between the first and second adsorption columns (34) and (35), thereby continuously producing a gas mixture in a stable manner. This switching operation is controlled by a controller (55).

The first and second adsorption columns (34) and (35) are configured as cylindrical members filled with an adsorbent, and are disposed upright (i.e., disposed such that each axis direction thereof is a vertical direction). The first and second adsorption columns (34) and (35) produce oxygen-enriched air by adsorbing nitrogen in the compressed air supplied from the pressurization portion (31a) of the air pump (31). The adsorbent that fills the first and second adsorption columns (34) and (35) has the property of adsorbing nitrogen in a state where the adsorption columns (34, 35) are pressurized, and desorbing nitrogen in a state where the adsorption columns (34, 35) are depressurized.

The adsorbent that fills the first and second adsorption columns (34) and (35) may be comprised of porous zeolite having pores with a diameter that is, e.g., smaller than the diameter (of 3.0 angstrom) of nitrogen molecules and larger than the diameter (of 2.8 angstrom) of oxygen molecules. Use of the zeolite having such a diameter allows for adsorbing nitrogen in the air.

In the pores of zeolite, cations exist, and thus, an electric field has been generated to cause polarity. Therefore, zeolite has the property of adsorbing polarity molecules such as water molecules. As a result, the adsorbent made of zeolite and filling the first and second adsorption column (34) and (35) adsorbs not only nitrogen in the air but also moisture (steam) in the air. The moisture adsorbed onto the adsorbent is desorbed, together with nitrogen, from the adsorbent as a result of the desorption operation. As a result, a gas mixture including moisture is supplied to the interior of the container (11), thus increasing the humidity in the interior of the container (11). Furthermore, the adsorbent is regenerated, and therefore, may have its life extended.

If the first and second adsorption columns (34) and (35) are depressurized by the depressurization portion (31b) of the air pump (31), the nitrogen adsorbed onto the adsorbent is desorbed. This produces nitrogen-enriched air (i.e., a gas mixture that has had its oxygen concentration lowered by including more nitrogen than the outside air does.). This gas mixture may have 90% of nitrogen and 10% of oxygen, for example.

In a conventional device of producing a high-purity nitrogen gas having a nitrogen concentration of more than 99% using a membrane separator, the pressurization pressure of an air pump is set to be a relatively high value (of about 827.6 kPa, for example).

In contrast, the gas mixture supply device (30) according to this embodiment may produce a gas mixture comprised of 90% of nitrogen and 10% of oxygen. Thus, it is sufficient to set the pressurization pressure of the air pump (31) to be a relatively low value (of about 150 kPa, for example). Accordingly, in the gas mixture supply device (30) of this embodiment, the pressurization pressure of the air pump (31) does not need to be as high as in the conventional one. This allows for reducing the size of the pressurization portion (31a).

Compared to the conventional device, the gas mixture supply device (30) of this embodiment needs a depressurization portion (31b) desorbing nitrogen from the adsorbent as an additional member. However, in order to desorb nitrogen from the adsorbent, it is sufficient to reduce the internal pressure of each of the adsorption columns (34, 35) to, e.g., about −50 kPa. Thus, this also allows for reducing the size of the depressurization portion (31b). That is to say, the overall weight of the gas mixture supply device (30) of this embodiment including the air pump (31) with a small pressurization portion (31a) and a small depressurization portion (31b) may be lighter than that of the conventional device including a large air compressor.

The gas mixture is supplied to the interior of the container (11) through a gas mixture supply passage (44) as a supplier. The gas mixture supply passage (44) is provided with a check valve (44a).

The respective lower ends of each of the first and second adsorption columns (34) and (35) (functioning as an outlet port during pressurization and an inlet port during depressurization) communicates with an oxygen tank (39) via first and second check valves (37) and (38) preventing backflow.

The oxygen tank (39) temporarily retains oxygen-enriched air produced in the first and second adsorption columns (34) and (35). The outlet port of the oxygen tank (39) is connected to an oxygen exhaust passage (45) communicating with the exterior of the container (11). The oxygen exhaust passage (45) is provided with an orifice (61)

and a check valve (45a). The oxygen-enriched air retained in the oxygen tank (39) is depressurized in the orifice (61), and then, is exhausted out of the container (11) through the oxygen exhaust passage (45).

Figure 5:
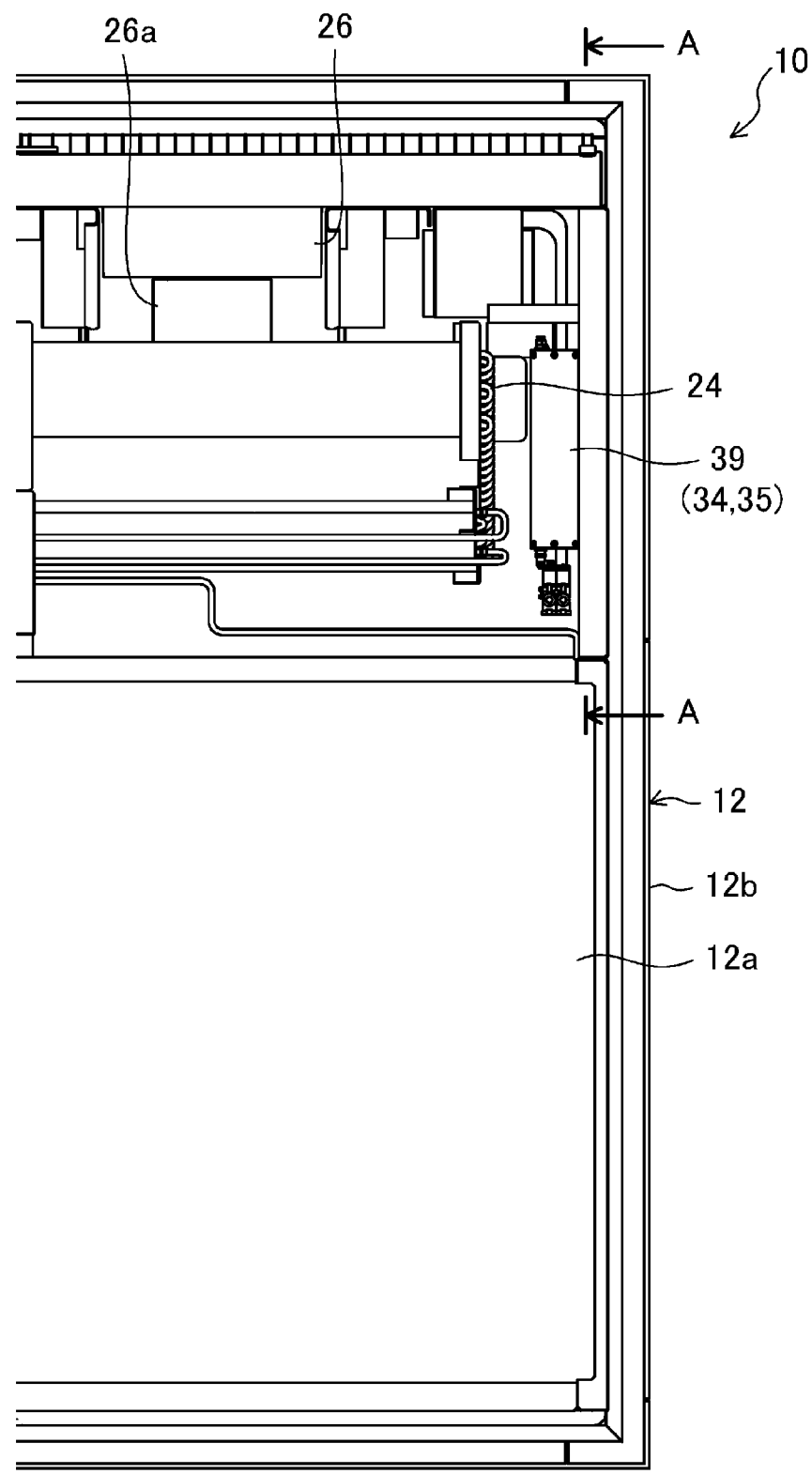
FIG. 5 is a front view of a casing according to the first embodiment, as viewed from the interior of the container.
Figure 6:
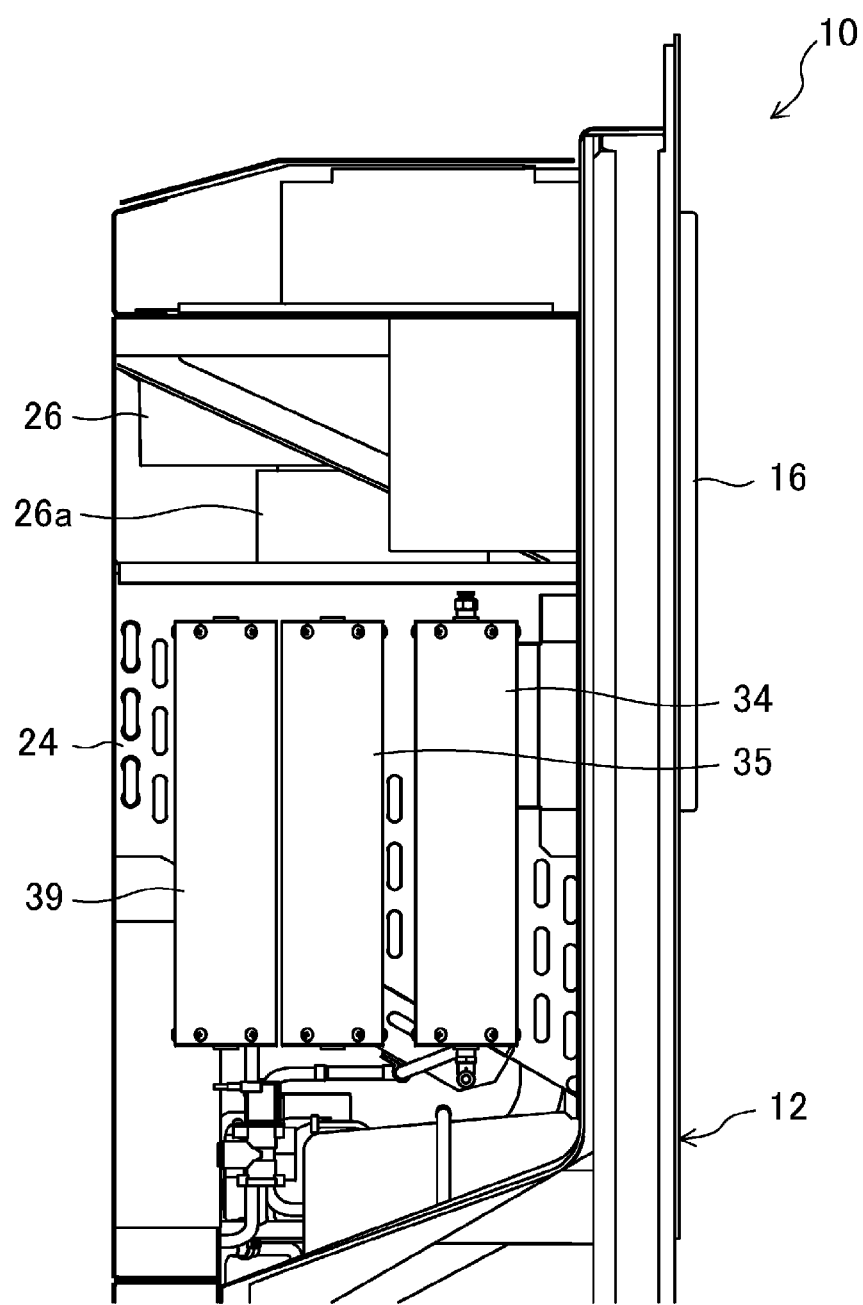
FIG. 6 is a cross-sectional view taken along the plane indicated by the arrows A-A of FIG. 5.

The first and second adsorption columns (34) and (35), and the oxygen tank (39) are disposed near the evaporator (24) in the internal storage space (S2). Specifically, as illustrated in FIGS. 5 and 6, the first and second adsorption columns (34) and (35), and the oxygen tank (39) are provided to stand upright in the gap between the sidewall of the container (11) and the evaporator (24), and are arranged side by side in the depth direction of the container (11).

The respective lower ends of the first and second adsorption columns (34) and (35) communicate with each other via the purge valve (36). An orifice (62) is attached to the pipe between the lower end of the first adsorption column (34) and the purge valve (36), and another orifice (62) is attached to the pipe between the lower end of the second adsorption column (35) and the purge valve (36).

The purge valve (36) is used to introduce a predetermined amount of the oxygen-enriched air into an adsorption column on the depressurization side (the second adsorption column (35) in FIG. 4) from an adsorption column on the pressurization side (the first adsorption column (34) in FIG. 4) to discharge nitrogen from the adsorbent of the adsorption column on the depressurization side. The controller (55) controls an opening/closing operation of the purge valve (36).

Operation of Gas Mixture Supply Device

It will now be described how the gas mixture supply device (30) produces a gas mixture.

The gas mixture supply device (30) alternately performs, at a predetermined time interval (of, for example, 15 seconds), a first operation of depressurizing the second adsorption column (35) while pressurizing the first adsorption column (34), and a second operation of pressurizing the second adsorption column (35) while depressurizing the first adsorption column (34). The switch between the first and second operations is made by having the first and second directional control valves (32) and (33) turned by the controller (55).

<First Operation>

In the first operation, the pressurization portion (31a) performs an adsorption operation on the first adsorption column (34), and the depressurization portion (31b) performs a desorption operation on the second adsorption column (35). That is to say, during the first operation, the gas mixture supply device (30) enters a first operation state where the pressurization portion (31a) supplies air to the first adsorption column (34) while the depressurization portion (31b) sucks air from the second adsorption column (35).

In the first operation, the first and second directional control valves (32) and (33) are turned to the state illustrated in FIG. 4. Specifically, the first directional control valve (32) allows the first adsorption column (34) to communicate with the pressurization portion (31a) but shuts off the first adsorption column (34) from the depressurization portion (31b), and the second directional control valve (33) allows the second adsorption column (35) to communicate with the depressurization portion (31b) but shuts off the second adsorption column (35) from the pressurization portion (31a).

The pressurization portion (31a) supplies the first adsorption column (34) with the pressurized outside air. The nitrogen in the air that has flown into the first adsorption column (34) is adsorbed onto the adsorbent of the first adsorption column (34). The air that has been deprived of nitrogen by the adsorbent of the first adsorption column (34) (i.e., oxygen-enriched air with a higher oxygen concentration than the outside air) flows out from the first adsorption column (34), passes through the first check valve (37) and the oxygen tank (39) in this order, and then is exhausted out of the container.

In the meantime, the depressurization portion (31b) sucks air from the second adsorption column (35). At that time, nitrogen is desorbed from the adsorbent of the second adsorption column (35). Thus, the depressurization portion (31b) sucks the air including nitrogen (a gas mixture that is nitrogen-enriched air with a higher nitrogen concentration than the outside air) from the adsorbent of the second adsorption column (35). The gas mixture sucked from the second adsorption column (35) into the depressurization portion (31b) is discharged from the depressurization portion (31b), passes through the gas mixture supply passage (44), and then is supplied to the interior of the container (11).

<Second Operation>

In the second operation, the pressurization portion (31a) performs an adsorption operation on the second adsorption column (35), and the depressurization portion (31b) performs a desorption operation on the first adsorption column (34). Specifically, during the second operation, the gas mixture supply device (30) enters a second operation state where the pressurization portion (31a) supplies air to the second adsorption column (35) while the depressurization portion (31b) sucks air from the first adsorption column (34).

In the second operation, the first and second directional control valves (32) and (33) are turned to the opposite side from the state illustrated in FIG. 4. Specifically, the first directional control valve (32) allows the first adsorption column (34) to communicate with the depressurization portion (31b) but shuts off the first adsorption column (34) from the pressurization portion (31a), and the second directional control valve (33) allows the second adsorption column (35) to communicate with the pressurization portion (31a) but shuts off the second adsorption column (35) from the depressurization portion (31b).

The pressurization portion (31a) supplies the second adsorption column (35) with the pressurized outside air. The nitrogen in the air that has flown into the second adsorption column (35) is adsorbed onto the adsorbent of the second adsorption column (35). The air that has been deprived of nitrogen by the adsorbent of the second adsorption column (35) (i.e., oxygen-enriched air with a higher oxygen concentration than the outside air) flows out from the second adsorption column (35), passes through the second check valve (38) and the oxygen tank (39) in this order, and then is discharged out of the container.

In the meantime, the depressurization portion (31b) sucks air from the first adsorption column (34). At this time, nitrogen is desorbed from the adsorbent of the first adsorption column (34). Thus, the depressurization portion (31b) sucks air including nitrogen (a gas mixture that is nitrogen-enriched air with a higher nitrogen concentration than the outside air) from the adsorbent of the first adsorption column (34). The gas mixture sucked from the first adsorption column (34) into the depressurization portion (31b) is discharged from the depressurization portion (31b), passes through the gas mixture supply passage (44), and then is supplied to the interior of the container (11).

Control of Oxygen Concentration and Carbon Dioxide Concentration

The controller (55) controls the oxygen concentration and the carbon dioxide concentration in the interior of the container based on detection results obtained by the oxygen concentration detection sensor (51) and the carbon dioxide concentration detection sensor (52). It will now be described, with reference to the flowcharts of FIGS. 7 and 8, how the controller (55) operates.

<Control of Oxygen Concentration>

Figure 7:
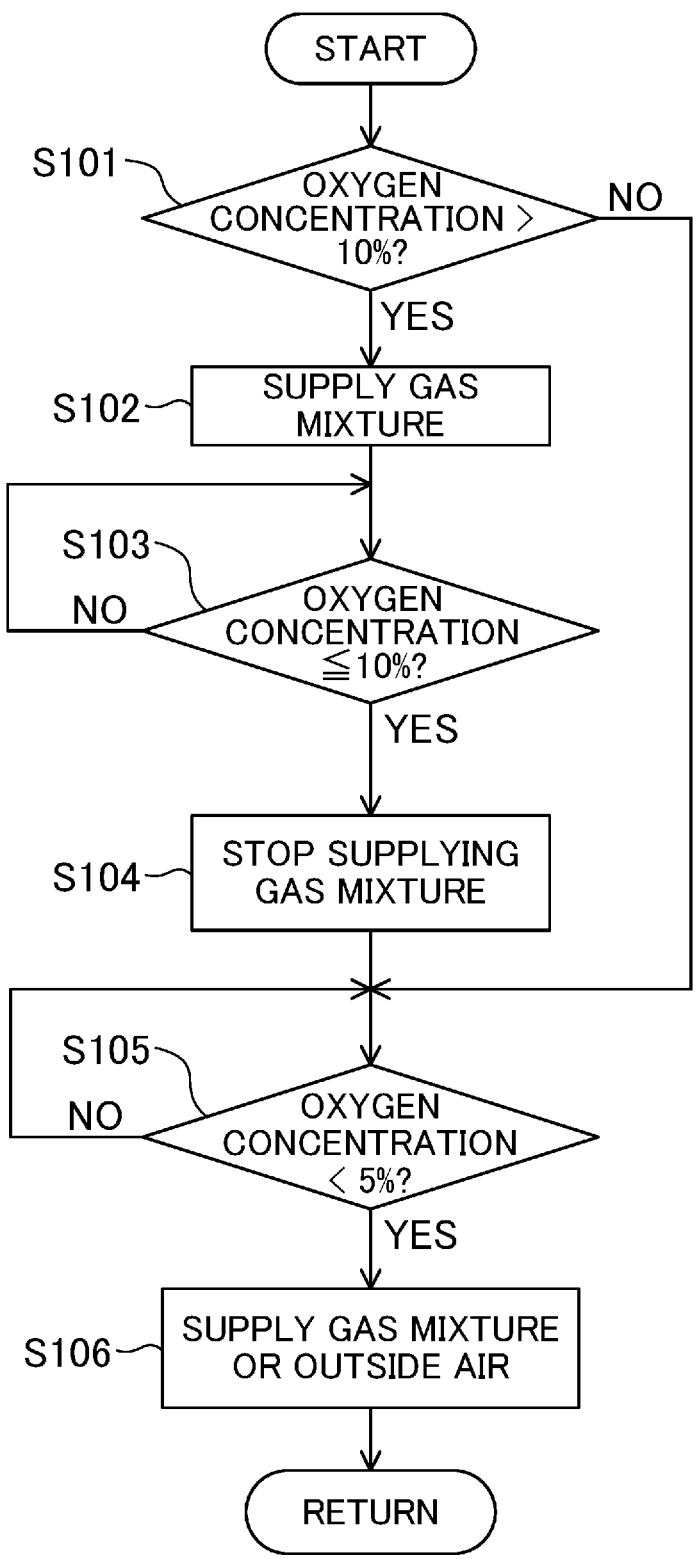
FIG. 7 is a flowchart showing a procedure of controlling an oxygen concentration in the interior of the container.

FIG. 7 is a flowchart showing the procedure of controlling the oxygen concentration in the interior of the container. As shown in FIG. 7, first, in Step S101, the controller (55) determines whether or not the oxygen concentration detected by the oxygen concentration detection sensor (51) is higher than that of the gas mixture (including 10% of oxygen). If the answer in Step S101 is YES (i.e., if the oxygen concentration is more than 10%), the controller (55) proceeds to Step S102. On the other hand, if the answer in Step S101 is NO (i.e., if the oxygen concentration is equal to or less than 10%), the controller (55) proceeds to Step S105.

In Step S102, the controller (55) allows the gas mixture supply device (30) to supply the interior of the container (11) with the gas mixture (including 90% of nitrogen and 10% of oxygen). Then, the controller (55) proceeds to Step S103.

In Step S103, the controller (55) determines whether or not the oxygen concentration detected by the oxygen concentration detection sensor (51) has decreased to be equal to or less than the oxygen concentration (including 10% of oxygen) of the gas mixture. If the answer in Step S103 is YES (i.e., if the oxygen concentration is equal to or less than 10%), the controller (55) proceeds to Step S104. On the other hand, if the answer in Step S103 is NO (i.e., if the oxygen concentration is more than 10%), the controller (55) enters a standby state.

In Step S104, the controller (55) instructs the gas mixture supply device (30) to stop supplying the gas mixture. In this case, in the interior of the container (11), plants (15) stored therein perform respiration. That is to say, in the interior of the container (11), oxygen included in the inside air is taken into the plants (15), and the carbon dioxide produced by the respiration of the plants (15) is released to the interior of the container (11). Therefore, in the state where the operation of supplying the gas mixture from the gas mixture supply device (30) to the interior of the container (11) is stopped, as the oxygen concentration in the interior of the container (11) gradually falls, the carbon dioxide concentration gradually rises.

Then, the controller (55) proceeds to Step S105. In Step S105, the controller (55) determines whether or not the oxygen concentration detected by the oxygen concentration detection sensor (51) has decreased to be less than a target oxygen concentration (of 5%). In this embodiment, if the plants (15) are bananas, the target concentration of the oxygen concentration is set to be 5%. If the plants (15) are avocados, however, it is recommended that the target concentration be set to be 3%.

If the answer in Step S105 is YES (i.e., if the oxygen concentration is less than 5%), the controller (55) proceeds to Step S106. On the other hand, if the answer in Step S105 is NO (i.e., if the oxygen concentration is equal to or more than 5%), the controller (55) enters a standby state.

In Step S106, the controller (55) instructs the gas mixture supply device (30) to supply the interior of the container (1) with the gas mixture (including 90% of nitrogen and 10% of oxygen) or instructs the intake portion (47) to supply the interior of the container (11) with outside air. Thereafter, the series of process steps described above will be repeatedly performed all over again. In Step S106, the supply of the gas mixture by the gas mixture supply device (30) and the supply of outside air by the intake portion (47) may be simultaneously performed.

<Control of Carbon Dioxide Concentration>

Figure 8:
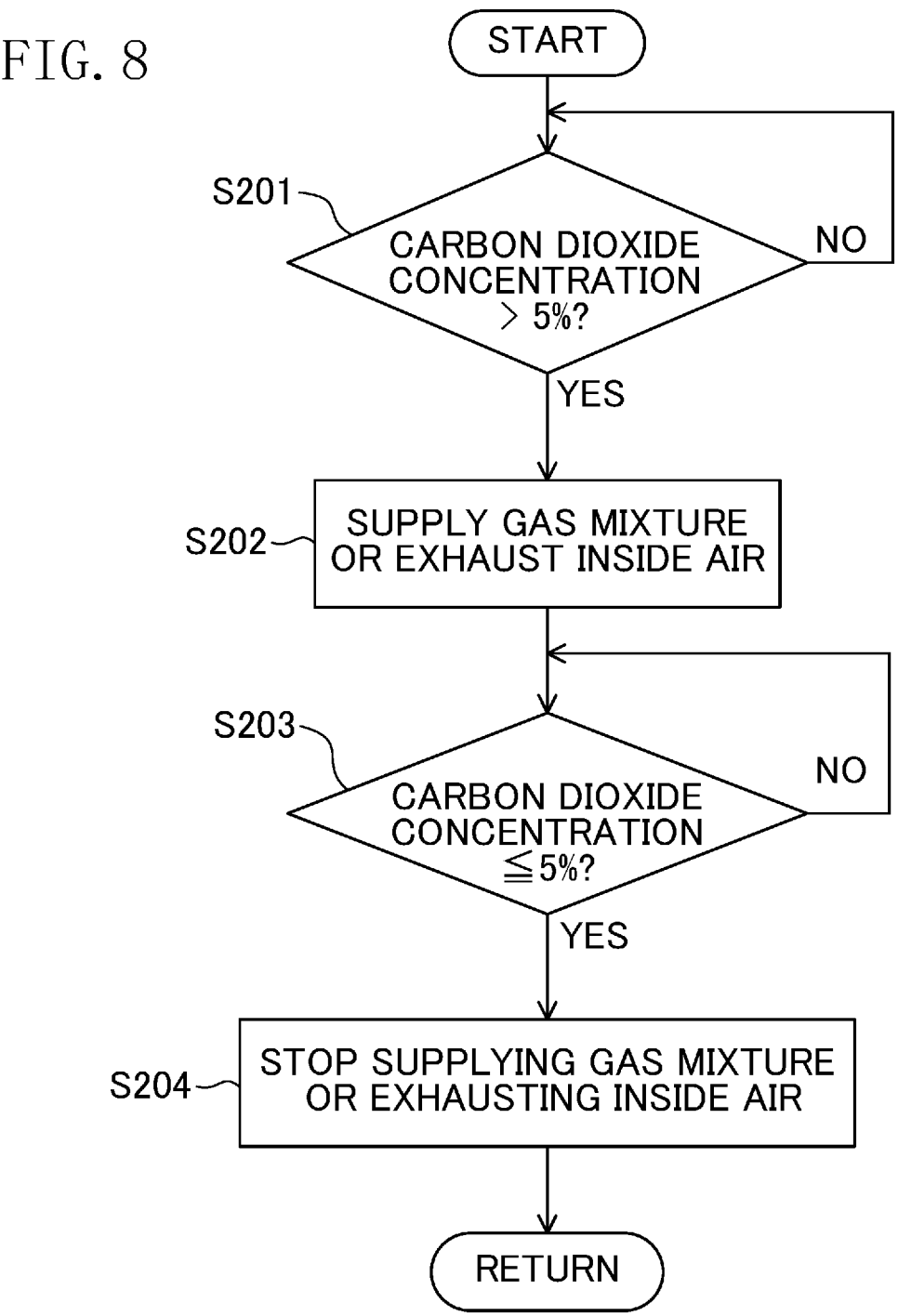
FIG. 8 is a flowchart showing a procedure of controlling a carbon dioxide concentration in the interior of the container.

FIG. 8 is a flow chart showing the procedure of controlling the carbon dioxide concentration in the interior of the container. As shown in FIG. 8, first, in Step S201, the controller (55) determines whether or not the carbon dioxide concentration detected by the carbon dioxide concentration detection sensor (52) is higher than a predetermined target concentration (of 5%). In this embodiment, if the plants (15) are bananas, the target concentration of carbon dioxide is set to be 5%. If the plants (15) are avocados, it is recommended that the target concentration be set to be 10%.

If the answer in Step S201 is YES (i.e., if the carbon dioxide concentration is more than 5%), the controller (55) proceeds to Step S202. On the other hand, if the answer in Step S201 is NO (i.e., if the oxygen concentration is equal to or less than 5%), the controller (55) enters a standby state.

In Step S202, the controller (55) instructs the gas mixture supply device (30) to supply the interior of the container (11) with the gas mixture (including 90% of nitrogen and 10% of oxygen) or instructs the exhaust portion (46) to exhaust air out of the interior of the container (11). In Step S202, the supply of the gas mixture by the gas mixture supply device (30) and the exhaust of the inside air by the exhaust portion (46) may be simultaneously performed.

Thereafter, the controller (55) proceeds to Step S203. In Step S203, the controller (55) determines whether or not the carbon dioxide concentration detected by the carbon dioxide concentration detection sensor (52) has decreased to be equal to or less than the target carbon dioxide concentration. If the answer in Step S203 is YES (i.e., if the carbon dioxide concentration is equal to or less than 5%), the controller (55) proceeds to Step S204. On the other hand, if the answer in Step S203 is NO (i.e., if the carbon dioxide concentration is more than 5%), the controller (55) enters a standby state.

In Step S204, the controller (55) instructs the gas mixture supply device (30) to stop supplying the gas mixture or instructs the exhaust portion (46) to stop exhausting the inside air. Thereafter, the controller (55) repeatedly performs the series of process steps described above all over again.

Advantages of First Embodiment

The container refrigeration apparatus (10) of this embodiment uses an adsorbent adsorbing nitrogen to produce a gas mixture including 90% of nitrogen and 10% of oxygen, for example. Therefore, the pressurization pressure of the pressurization portion (31a) of the air pump (31) does not need to be so high. Thus, this embodiment allows for reducing the size of the pressurization portion (31a). In order to desorb nitrogen from the adsorbent, the pressure of each of the adsorption columns (34) and (35) does not need to be so low. Thus, this also allows for reducing the size of the depressurization portion (31b) of the air pump (31). Accordingly, this embodiment allows for reducing the size of the gas mixture supply device (30) using the small air pump (31), and further allows for reducing the weight and cost of the container refrigeration apparatus (10).

Also, according to the configuration adopted in this embodiment, nitrogen in the air is adsorbed onto the adsorbent. Thus, there is no need to use any air heater unlike the conventional apparatus. On top of that, the plants (15) stored in the container (11) perform respiration and release carbon dioxide. Thus, no carbon dioxide bottle needs to be provided separately, either, to increase the carbon dioxide concentration in the container. This allows for reducing the overall size of the apparatus and eventually reducing not only its weight but also its cost, compared to the conventional apparatus.

In the adsorbent of each of the first and second adsorption columns (34) and (35), the lower the ambient temperature is, the higher its adsorptivity is. In the container refrigeration apparatus (10) of this embodiment, the first and second adsorption columns (34) and (35) are disposed near the evaporator (24) in the internal storage space (S2). Thus, by keeping the temperature of the adsorbent of the first and second adsorption columns (34) and (35) low, the adsorption performance of the adsorbent is improvable to the point that nitrogen in the air is adsorbed easily.

In addition, according to this embodiment, moisture in the air is adsorbed, together with nitrogen in the air, onto the adsorbent during the adsorption operation, and the moisture adsorbed onto the adsorbent is desorbed, together with nitrogen, from the adsorbent during the desorption operation. As a result, in the container refrigeration apparatus (10) of this embodiment, a gas mixture including moisture is supplied to the interior of the container (11), which allows for increasing the humidity in the interior of the container (11). Furthermore, the adsorbent may be regenerated so as to have its life extended.

In the gas mixture supply device (30) of this embodiment, the pressurization portion (31a) and the depressurization portion (31b) are configured as oil-less pumps. This allows for overcoming disadvantages occurring when lubricant oil is used in the pumps. Specifically, this contributes to avoiding an unwanted situation where adsorption of oil included in the compressed air onto the adsorbent causes a decrease in the adsorption performance of the adsorbent, and another unwanted situation where a gas mixture with an oily odor is supplied to the interior of the container (11) loaded with the plants (15).

Second Embodiment

Figure 9:
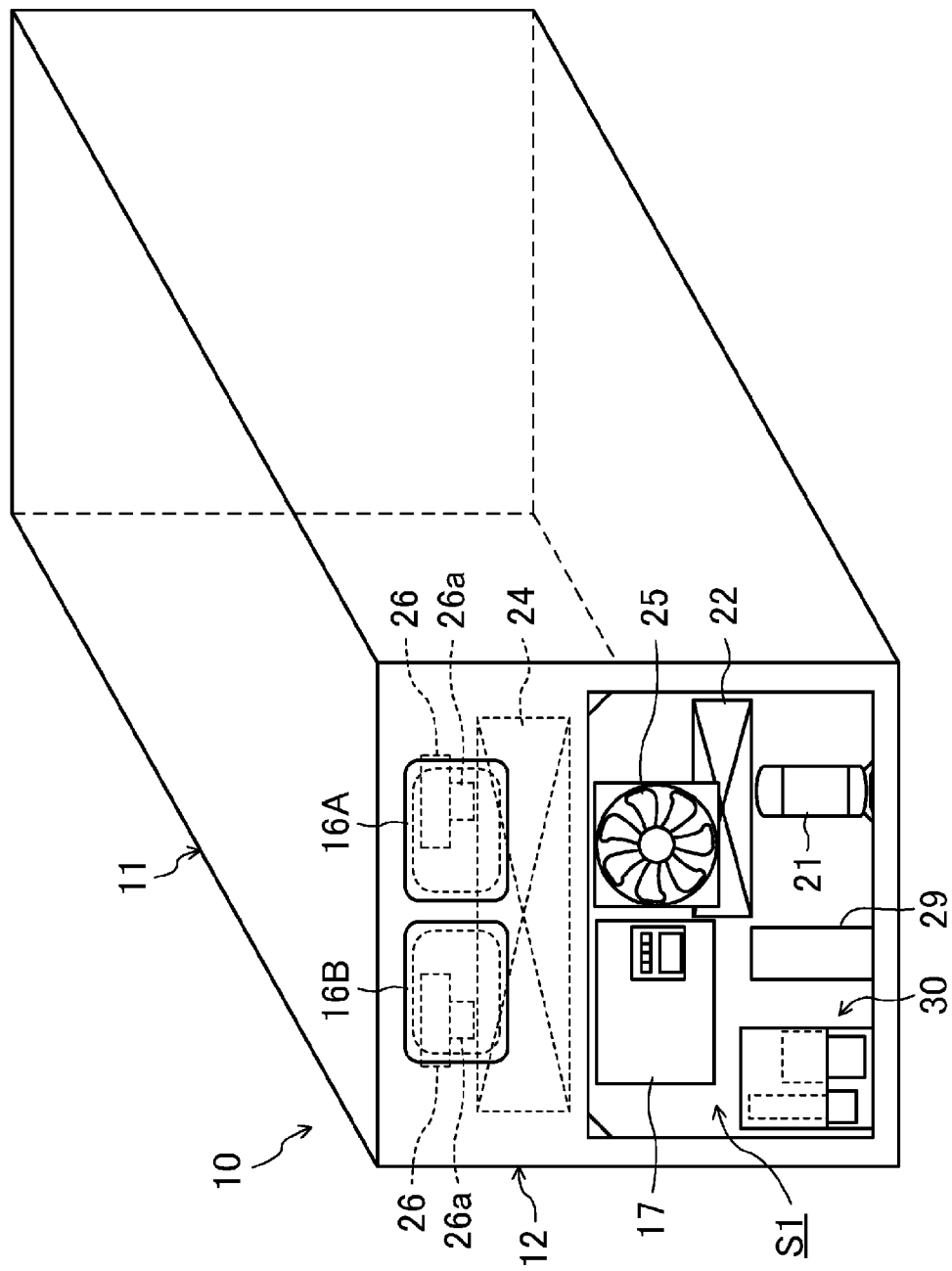
FIG. 9 is a perspective view of a container refrigeration apparatus according to a second embodiment, as viewed from the exterior of the container.
Figure 10:
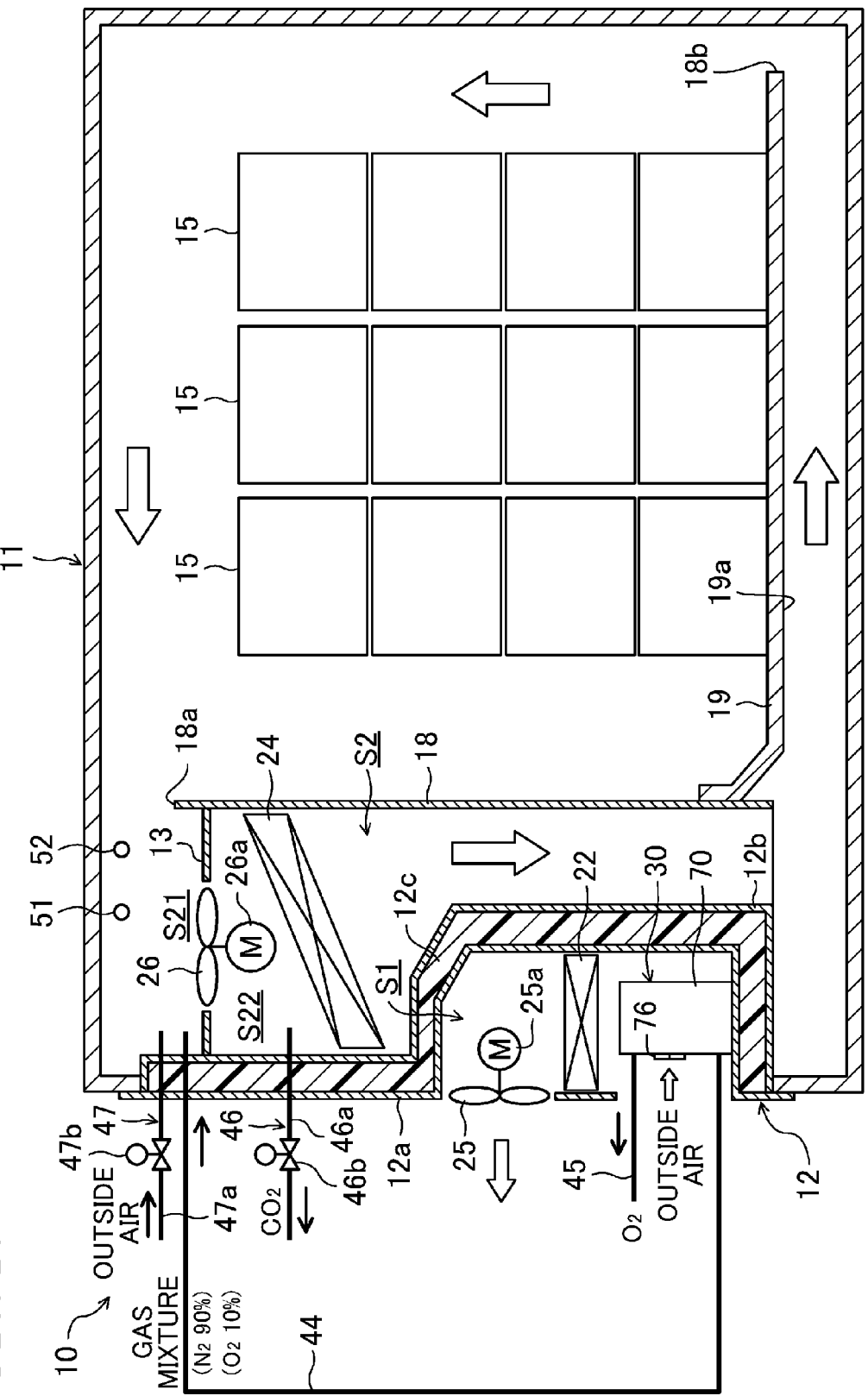
FIG. 10 is a side cross-sectional view illustrating a configuration of the container refrigeration apparatus according to the second embodiment.

A second embodiment will now be described. As illustrated in FIGS. 9 and 10, the container refrigeration apparatus (10) of this embodiment includes the gas mixture supply device (30), like the container refrigeration apparatus (10) of the first embodiment.

The container refrigeration apparatus (10) of this embodiment is obtained by changing the configuration of the gas mixture supply device (30) of the container refrigeration apparatus (10) of the first embodiment. The following description will be focused on the difference between the gas mixture supply device (30) of this embodiment and that of the first embodiment.

Figure 11:
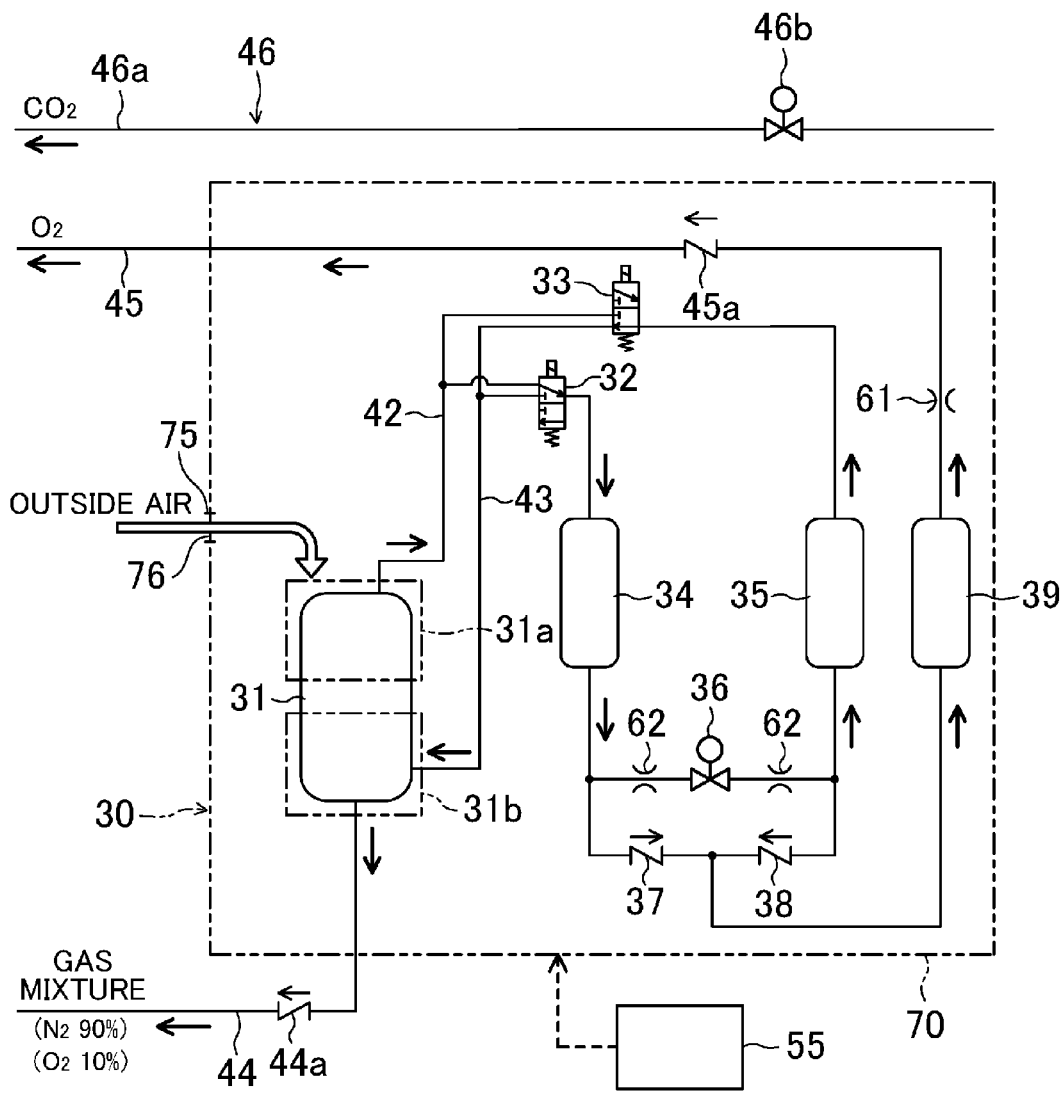
FIG. 11 is a piping system diagram illustrating a configuration of a gas mixture supply device according to the second embodiment.

Like the gas mixture supply device (30) of the first embodiment, the gas mixture supply device (30) of this embodiment also includes the air pump (31), the first and second directional controls valves (32) and (33), the first and second adsorption columns (34) and (35) each provided with an adsorbent adsorbing nitrogen in the air, the purge valve (36), the first and second check valves (37) and (38), and the oxygen tank (39) (see FIG. 11). The gas mixture supply device (30) of this embodiment forms a single unit by housing these components in a unit case (70).

As illustrated in FIG. 9, the gas mixture supply device (30) of this embodiment is disposed in the external storage space (S1). This gas mixture supply device (30) is configured to be attachable later as a separate part to the body of the container refrigeration apparatus (10). The configuration of the gas mixture supply device (30) will be described in detail later.

In the gas mixture supply device (30) of this embodiment, the air pump (31) is disposed in the unit case (70). This air pump (31) sucks and compresses outside air that has flowed into the unit case (70) through an air inlet port (75) provided through the unit case (70).

Next, the mechanical structure of the gas mixture supply device (30) will be specifically described with reference to FIGS. 12-17.

Figure 12:
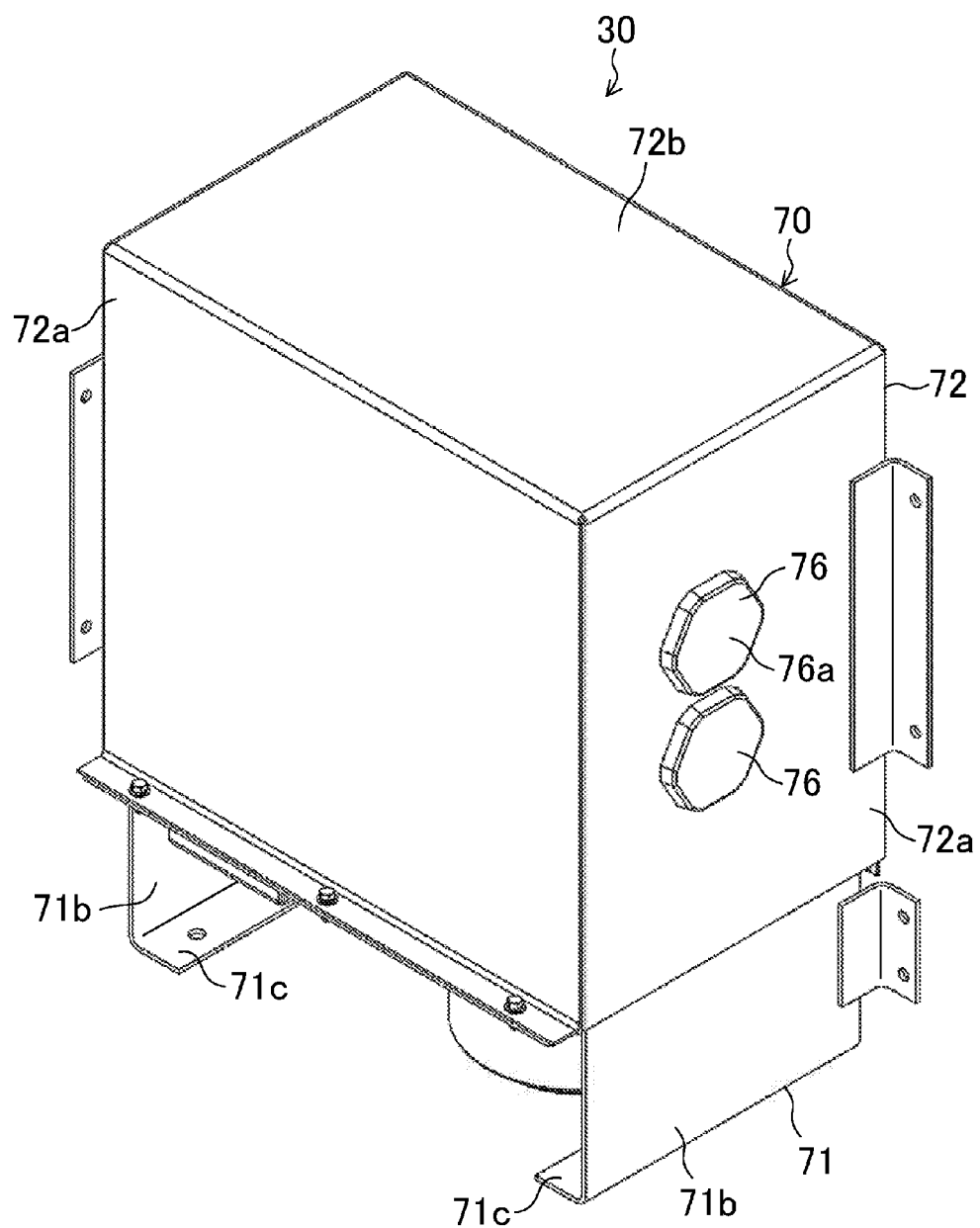
FIG. 12 is a perspective view illustrating an appearance of the gas mixture supply device according to the second embodiment.
Figure 13:
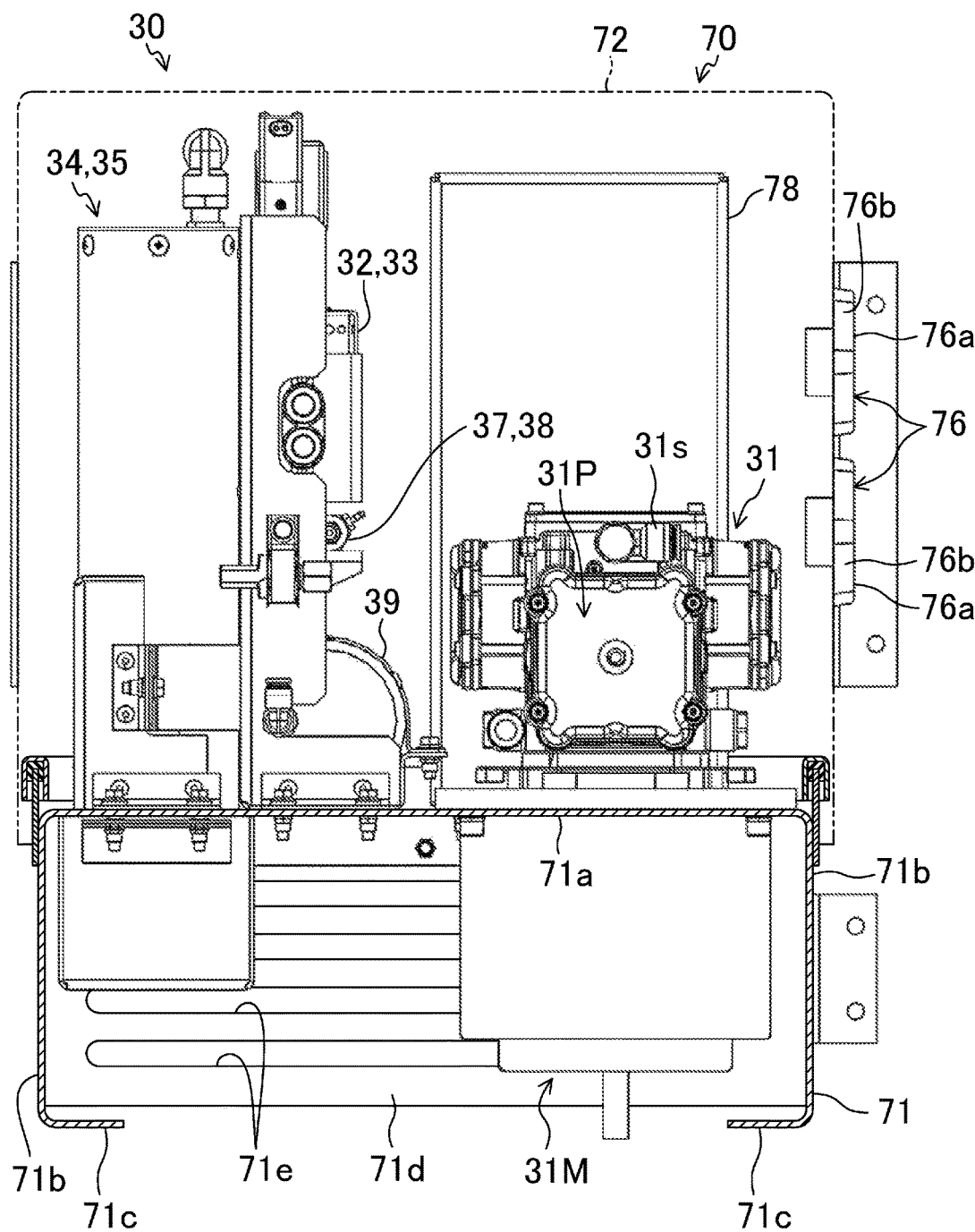
FIG. 13 is a cross-sectional view of the gas mixture supply device according to the second embodiment, as viewed from the front.

As illustrated in FIGS. 12 and 13, the unit case (70) is a member in the shape of a box. This unit base (70) includes a base (71) and a cover (72). The base (71) includes, as illustrated in FIG. 13, a support plate (71a) supporting the internal components of the gas mixture supply device (30), leg plates (71b) each extending downward from the left or right end of the support plate (71a), and attachment plates (71c) each extending inward in the base (71) from the lower end of each of the leg plates (71b). The support plate (71a), the leg plates (71b), and the attachment plates (71c) are formed by bending a single metallic plate. The rear surface of the base (71) is provided with a ventilation plate (71d) in which a plurality of laterally extending slits (71e) are provided parallel to each other in the vertical direction.

Figure 18:
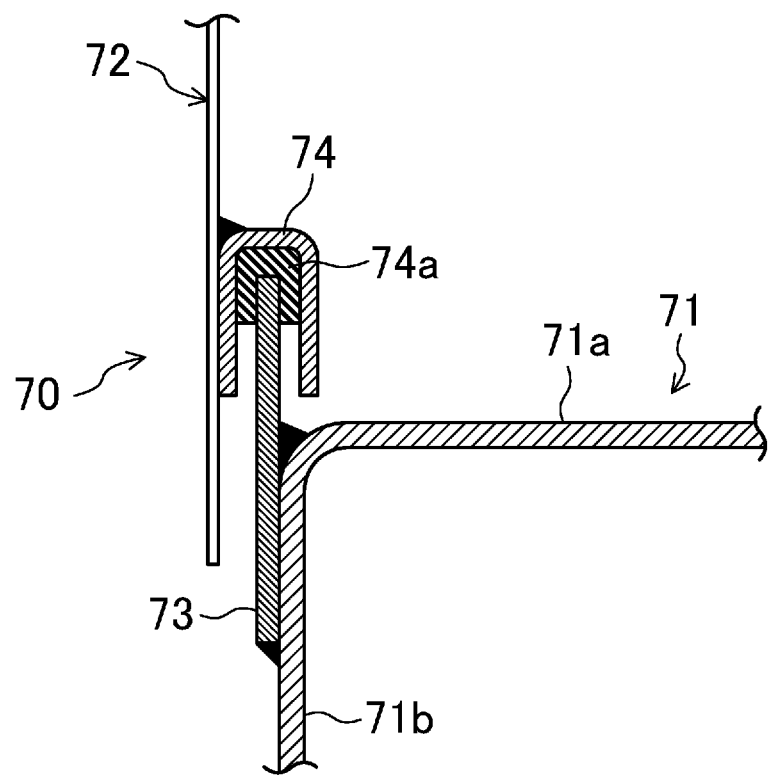
FIG. 18 is a cross-sectional view illustrating how a base and cover of a unit case are attached to each other according to the second embodiment.

The cover (72) has four side plates (72a), and a top panel (72b) closing the respective upper ends of the side plates (72a). This cover (72) has its lower end attached to the upper end of the base (71), and this attached portion is configured as a waterproof and airtight portion. Specifically, as illustrated in FIG. 18, a support plate (73) is fixed to the entire periphery of the upper end of the base, and the entire inner periphery of the lower end of the cover (72) is provided with a seal holding portion (74) holding a sealant (74a). The unit case (70) has an integrated structure in which where the base (71) and the cover (72) are combined together by securing the base (71) and the cover (72) to each other with fastening members such as bolts with the support plate (73) sealed with the sealant (74a). In this integral unit case (70), thea space surrounded by the support plate (71a) of the base (71) and the cover (72) functions as a waterproof, airtight component housing space.

A side surface of the unit case (70) illustrated on the right side in FIG. 12 is provided with permeable, waterproof membrane filters (76). The unit case (70) is provided with the air inlet port (75) that allows the air pump (31) to suck air into the unit case (70), as illustrated in FIG. 11, and the membrane filters (76) are fitted in the air inlet port (75) of this unit case (70). These membrane filters (76) are permeable as stated above. Thus, activation of the air pump (31) allows for sucking air into the unit case (70) through the membrane filters (76). On the other hand, the membrane filters (76) are waterproof and do not allow moisture to pass therethrough. Thus, no moisture enters the unit case (70). Examples of the membrane filters (76) include a vent filter manufactured by W. L. Gore & Associates.

The membrane filters (76) each include a flat cap (76a) made of plastic, and a membrane filer member fitted in the cap (76a) (not illustrated). The cap (76a) has the shape of a substantially regular hexagon, and has its outer peripheral surface (76b) provided with an air ventilation port (not illustrated). The air flowing from outside the outer peripheral surface into the cap (76a) passes through the filter member. The filter member also catches dust in the air. Most of the dust caught is deposited to the outer peripheral surface of the cap (76a). The dust deposited on the outer peripheral surface of the cap (76a) is removed from the cap (76a) under the influence of the airflow in the external space of the container (11).

As described above, the component housing space for housing the components of the gas mixture supply device (30) is formed in the interior of the unit case (70) formed by assembling the base (71) and the cover (72) together. As illustrated in FIGS. 13-17, the unit case (70) houses components including a pump mechanism (31P) of the air pump (31), the first and second directional control valves (32) and (33), the first and second adsorption columns (34) and (35), the purge valve (36), the first and second check valves (37) and (38), and the oxygen tank (39). The respective components in the unit case (11) are connected together through pipes in accordance with the piping system diagram in FIG. 11, although this is not illustrated. The cover (72) of the unit case (70) is provided with an outlet port of the gas mixture (nitrogen-enriched air) and an outlet port of the oxygen-enriched air, although they are not illustrated.

Figure 14:
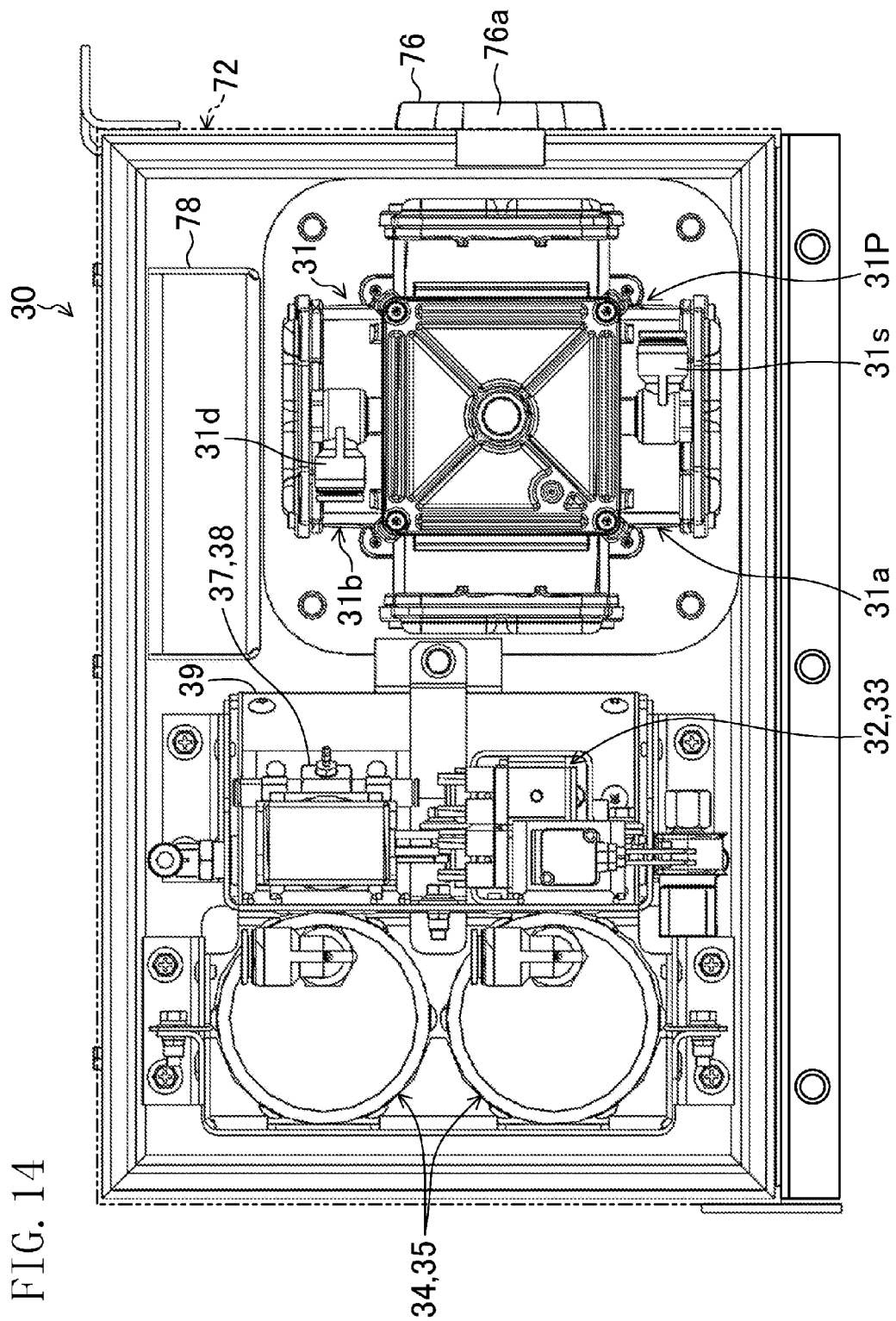
FIG. 14 is a plan view of the gas mixture supply device according to the second embodiment, and illustrates, with solid lines, how internal components of the gas mixture supply device are arranged.
Figure 16:
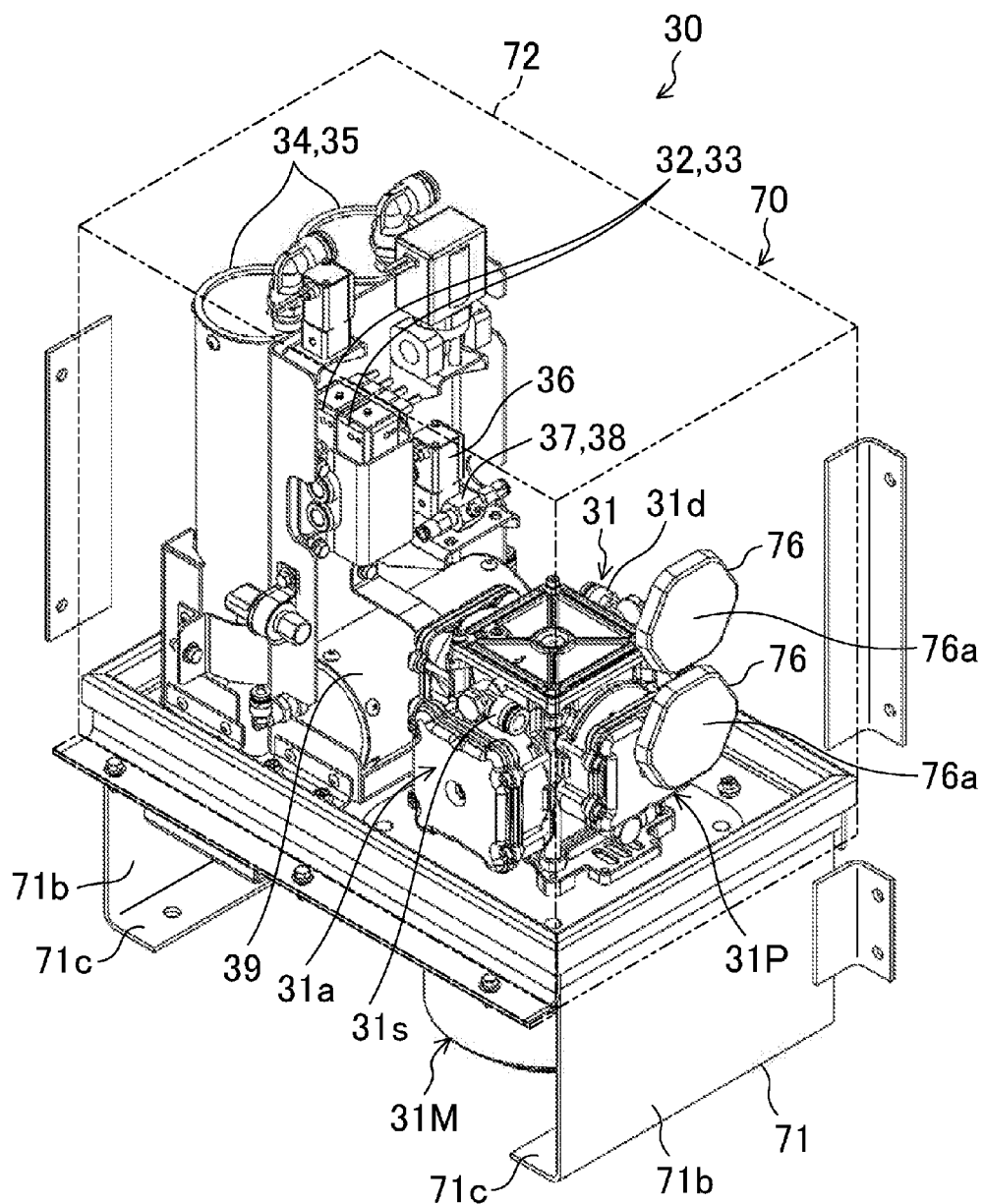
FIG. 16 is a front perspective view of the gas mixture supply device according to the second embodiment, and illustrates, with solid lines, how internal components of the gas mixture supply device are arranged.
Figure 17:
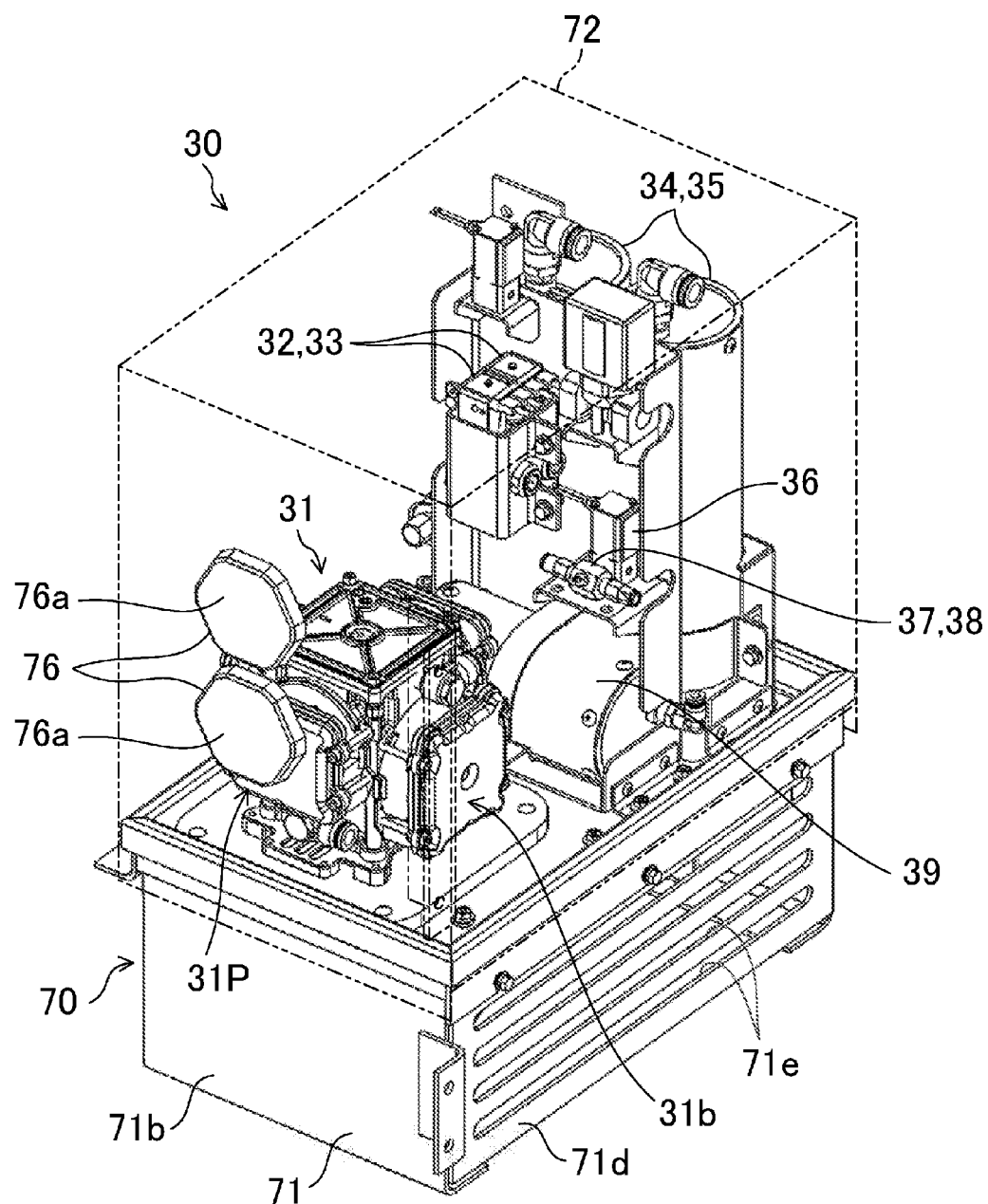
FIG. 17 is a rear perspective view of the gas mixture supply device according to the second embodiment, and illustrates, with solid lines, how internal components of the gas mixture supply device are arranged.

In FIGS. 13, 14, and 16, the air pump (31) is disposed at a position closer to the end on the right side of the internal space of the unit case (70). In FIGS. 13, 14, and 16, the first and second adsorption column (34) and (35) are disposed at a position closer to the end on the left side of the internal space of the unit case (70).

The air pump (31) includes the pump mechanism (31P) and a motor (31M). The pump mechanism (31P) is an implementation of the pressurization portion (31a) and the depressurization portion (31b). As in the first embodiment, the pressurization portion (31a) supplies, through the outflow passage (42), the adsorption columns (34, 35) with the air sucked and compressed. This pressurization portion (31a) sucks air through a suction port (31s) and discharges the air through an outlet port (31d). Also, as in the first embodiment, the depressurization portion (31b) sucks the air (nitrogen-enriched air) from the adsorption columns (34, 35) through the outflow passage (42), and discharges the air sucked to the gas mixture supply passage (44).

The motor (31M) of the air pump (31) is attached to the unit case (70) so as to protrude downward from the lower surface of the base (71). The motor (31M) may be provided such that at least part of the motor (31M) is located outside the unit case (70).

Figure 19:
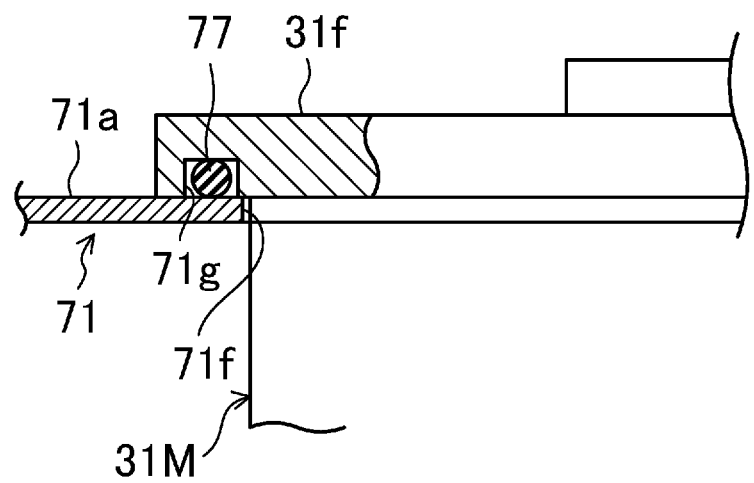
FIG. 19 is a cross-sectional view illustrating how a motor of an air pump is attached to the base of the unit case according to the second embodiment.

The motor (31M) is, as illustrated in FIG. 19, formed such that a flange (attachment portion) (31f) of the motor (31M) is secured to the support plate (71a) of the base (71) with fastening members such as bolts (not illustrated). Specifically, the body of the motor (31M) (a cylindrical portion of the motor (31M) under the flange (31f) is introduced into a motor attachment hole (71f) of the support plate (71a) from over the plate (71a), and the flange (31f) is secured to the support plate (71a) by fastening, e.g., bolts with the lower surface of the flange (31f) abutting against the support plate (71a). A sealing groove (71g) is formed on the lower surface of the flange (31f), and an O ring (77) (sealant) is fitted into the sealing groove (71g). Thus, the support plate (71a) and the flange (31f) may be airtight and waterproof. As can be seen, the O ring (77) functioning as a sealant is provided between the flange (31f) functioning as the attachment portion of the motor (31M) and the support plate (71a) of the unit case (70), thereby providing a sealing structure for this unit case (70).

The gas mixture supply device (30) of this embodiment includes the first and second adsorption columns (34) and (35) each provided with an adsorbent adsorbing/desorbing nitrogen in the air, just like the gas mixture supply device (30) of the first embodiment. In the gas mixture supply device (30) of this embodiment, the pressurization portion (31a) of the pump mechanism (31P) has its suction port (31s) opened, and has its outlet port (31d) connected to the first and second adsorption columns (34) and (35) via the first and second directional control valves (32) and (33), respectively.

The unit case (70) of this embodiment is provided with, in addition to the air inlet port (75) supplying the air pump (31) with the air, an outlet port (not illustrated) delivering the gas mixture including nitrogen (nitrogen-enriched air) from the first and second adsorption columns (34) and (35). The unit case (70) is further provided with the first and second directional control valves (32) and (33).

In the gas mixture supply device (30) of this embodiment, the motor (31M) is disposed upstream of the condenser (22), functioning as an external heat exchanger of the container refrigeration apparatus (10), in an airflow passing through the condenser (22). The motor (31M) is disposed at the upstream side of the air flow because, when the exterior fan (25) is activated, the outside air passes through the condenser (22) after passing around the components disposed under the external storage space (S1), and then is blown out from the exterior fan (25).

When the gas mixture supply device (30) is viewed in plan, the motor (31M) is disposed at a position closer to the end on the right side of the gas mixture supply device (30). Thus, with the gas mixture supply device (30) attached to the container refrigeration apparatus (10), the motor (31M) is disposed rather close to the exterior fan (25) among the components of the gas mixture supply device (30). Thus, this allows the airflow produced by the exterior fan (25) to easily flow around the motor (31M). The outside air that has passed through the motor (31M) passes through the slits (71e) of the ventilation plate (71d) to flow toward the condenser (22).

Having such a configuration, the gas mixture supply device (30) of this embodiment may be attached later as a separate component to the external storage space (S1) of the container refrigeration apparatus (10). In such a case, pipes supplying the interior of the container (11) with the gas mixture (nitrogen-enriched air) may be connected between the gas mixture supply device (30) and the container (11).

Figure 15:
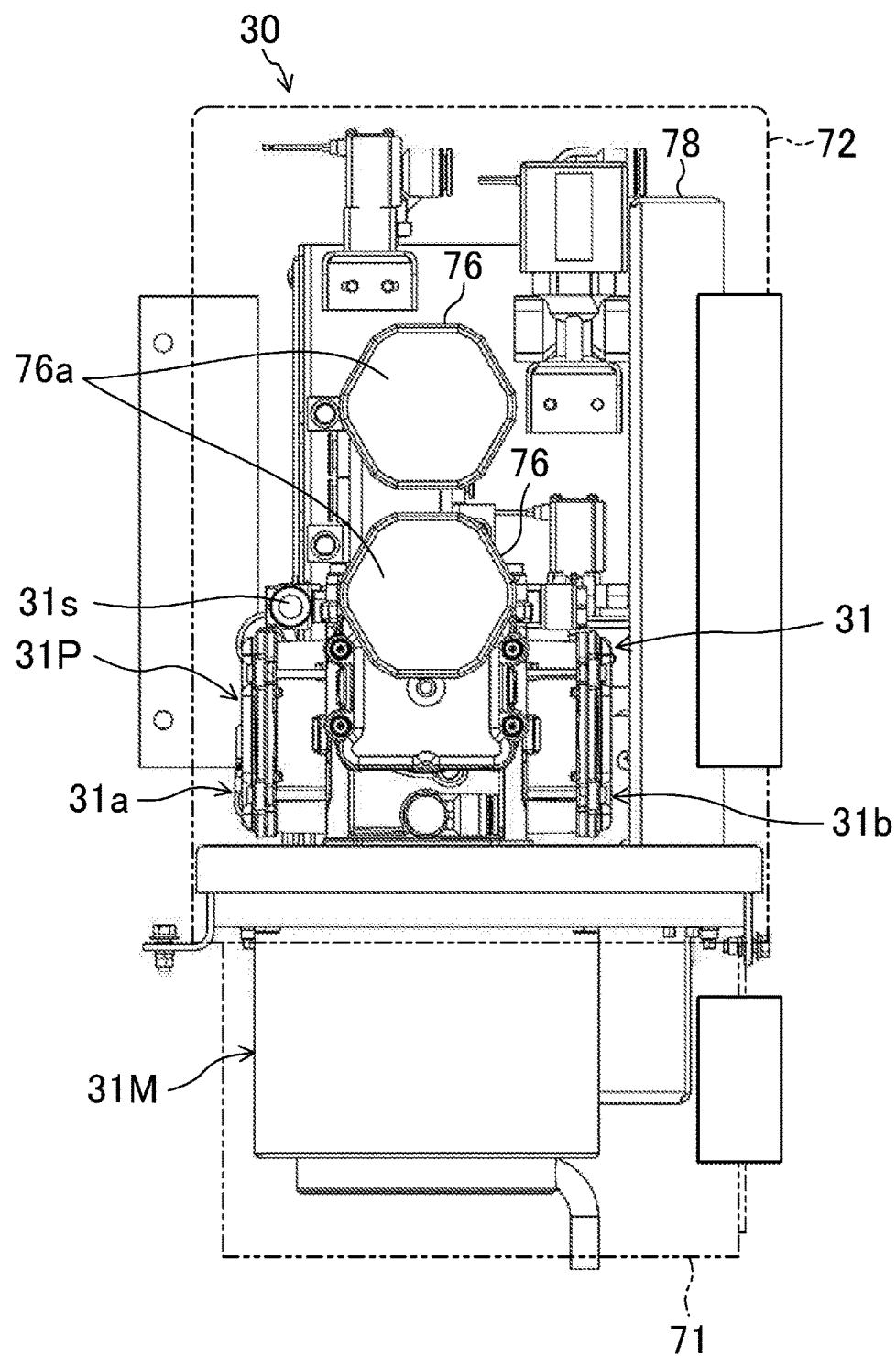
FIG. 15 is a right-side view of the gas mixture supply device according to the second embodiment, and illustrates, with solid lines, how internal components of the gas mixture supply device are arranged.

In FIGS. 13-15, for example, the component disposed behind the pump mechanism (31P) in the unit case (70) is electrical component module (78) housing, e.g., a control board. This electrical component module (78) may be shielded from noise by adopting a box structure in which the control board and other members are surrounded with a sheet metal member.

As illustrated in FIG. 9, the gas mixture supply device (30) with such a configuration is disposed at the lower left corner of the external storage space (S1). In FIG. 9, the component disposed on the right side of the gas mixture supply device (30) is an inverter box (29) housing a driver circuit driving the compressor (21) at variable velocities. If the calorific value of the inverter box (29) is compared to that of the gas mixture supply device (30), the former is larger than the latter. Thus, the inverter box (29) is disposed near the exterior fan (25) (at the downstream side of the airflow passing through the condenser (22)). To put it the other way around, the gas mixture supply device (30) is disposed upstream of the inverter box (29) in the airflow.

Like the gas mixture supply device (30) of the first embodiment, the gas mixture supply device (30) of this embodiment also repeatedly performs the first and second operations alternately to produce a gas mixture that is nitrogen-enriched air with a higher nitrogen concentration than the outside air. In the container refrigeration apparatus (10) of this embodiment, the controller (55) also controls, as in the first embodiment, the oxygen and carbon dioxide concentrations in the interior of the container (11).

Advantages of Second Embodiment

According to this embodiment, the gas mixture supply device (30) is implemented as a single unit by housing, e.g., the pump mechanism (31P) of the air pump (31), and adsorption columns (34, 35) in the unit case (70). This allows for using this gas mixture supply device (30) as a separate component to be attached later to the container refrigeration apparatus (10). Accordingly, even if this gas mixture supply device (30) of a unit type is attached to a conventional refrigeration apparatus for existent containers, the oxygen concentration in the interior of the containers may also be controlled by supplying a gas mixture (nitrogen-enriched air) to the interior of the containers. The gas mixture supply device (30) is implemented as a single unit, and thus, the unit may be easily replaced in its entirety with a new one, if the gas mixture supply device (30) goes out of order.

The gas mixture supply device (30) of this embodiment has a configuration in which the components are assembled together in the unit case (70) with an integral unit structure, and also has a waterproof and permeable structure by attaching the membrane filters (76) to the unit case (70). Accordingly, a temperature difference hardly arises between the interior and exterior of the unit case (70) even in a harsh environment where the outside air temperature varies significantly. Thus, the electrical components inside the unit case (70) have condensation so rarely that there are little chances of insulation failure occurring in the electrical components.

The unit case (70) is not airtight, and therefore, moisture permeates so rarely through the gap of the unit case (70) due to capillarity caused by the pressure difference between the interior and exterior of the container that there are little chances of insulation failure occurring in the electrical components. On the other hand, the unit case (70) is waterproof, and therefore, the electrical components and metallic components in the unit case (70) will not get corroded easily due to salt damage in a marine atmosphere.

Also, according to this embodiment, although dust in the air is deposited on the membrane filters (76) provided on the side surface of the unit case (70), the membrane filters (76) are not provided for the upper surface thereof. Thus, the dust is easily removable from the membrane filters (76) due to, e.g., vibration of the gas mixture supply device (30) during transportation of the container (11). This thus facilitates the maintenance of the membrane filters (76).

Furthermore, in this embodiment, only the motor (31M) of the air pump (31) functioning as a heat-generating portion is disposed outside the unit case (70), and is cooled by the airflow of the exterior fan (25). This allows for stabilizing the operation of the motor (31M). On top of that, this also allows for reducing the number of components to provide and the equipment cost more significantly than in a situation where the motor (31M) is put in the unit case (70), and provided with a dedicated cooling blower. If the motor (31M) were housed in the unit case (70), the heat generated by the motor (31M) could affect other components, thus possibly resulting in a decrease in the reliability of the gas mixture supply device (30). However, in this embodiment, the motor (31M) is disposed outside the unit case (70), and therefore, the reliability of the gas mixture supply device (30) is not affected. Although only the motor (31M) is disposed outside the unit case (70), the flange (31f) of the motor (31M) is attached to the unit case (70) via the O ring (77) functioning as a sealant. This thus allows for avoiding a decrease in the waterproof performance of the gas mixture supply device (30).

Third Embodiment

A third embodiment will now be described. The container refrigeration apparatus (10) of this embodiment is obtained by modifying the way of attaching the pump mechanism (31P) and the motor (31M) in the gas mixture supply device (30) of the container refrigeration apparatus (10) of the second embodiment. The following description will be focused on the difference between the gas mixture supply device (30) of this embodiment and that of the second embodiment.

Figure 20:
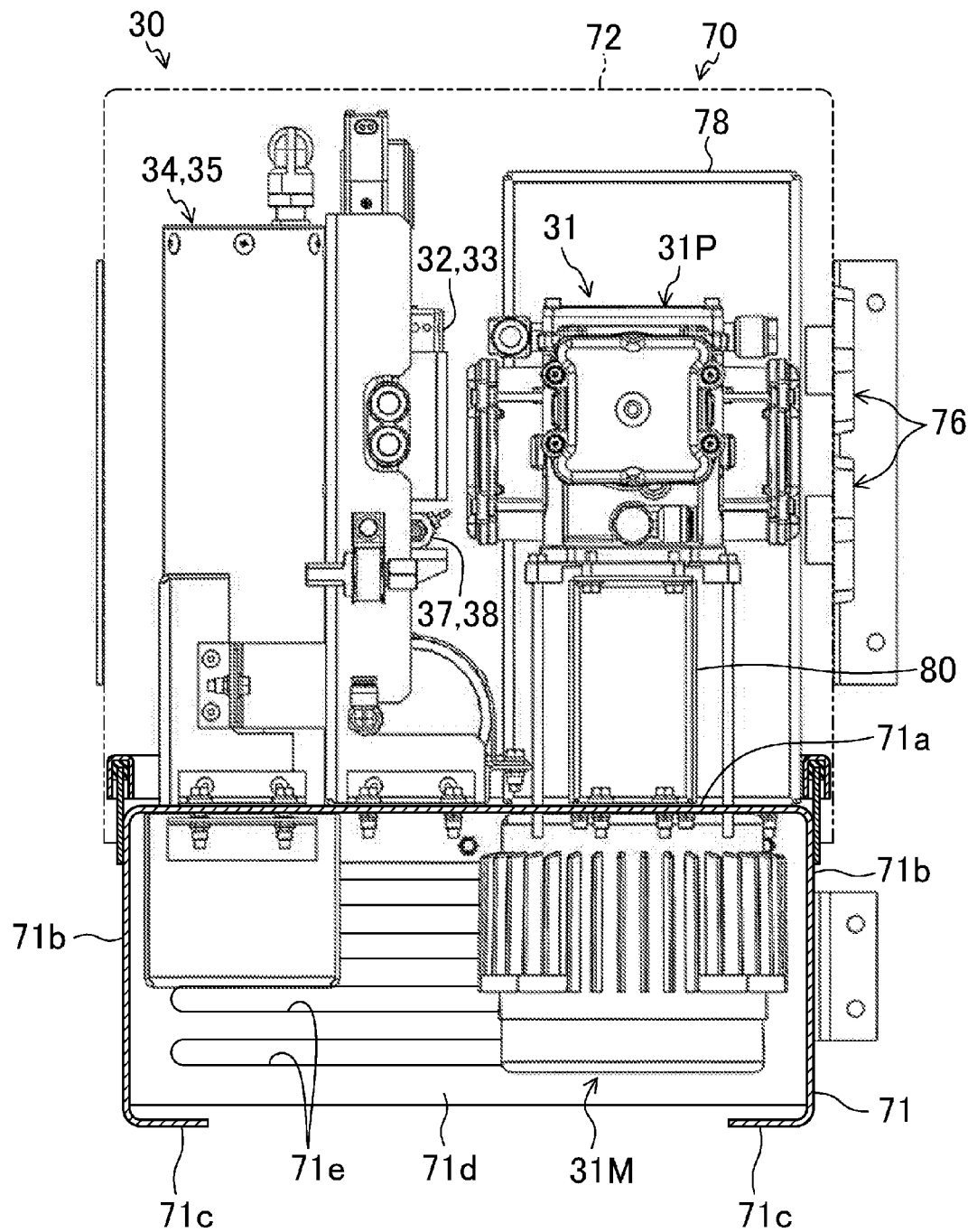
FIG. 20 is a cross-sectional view of a gas mixture supply device according to a third embodiment, as viewed from the front.
Figure 21:
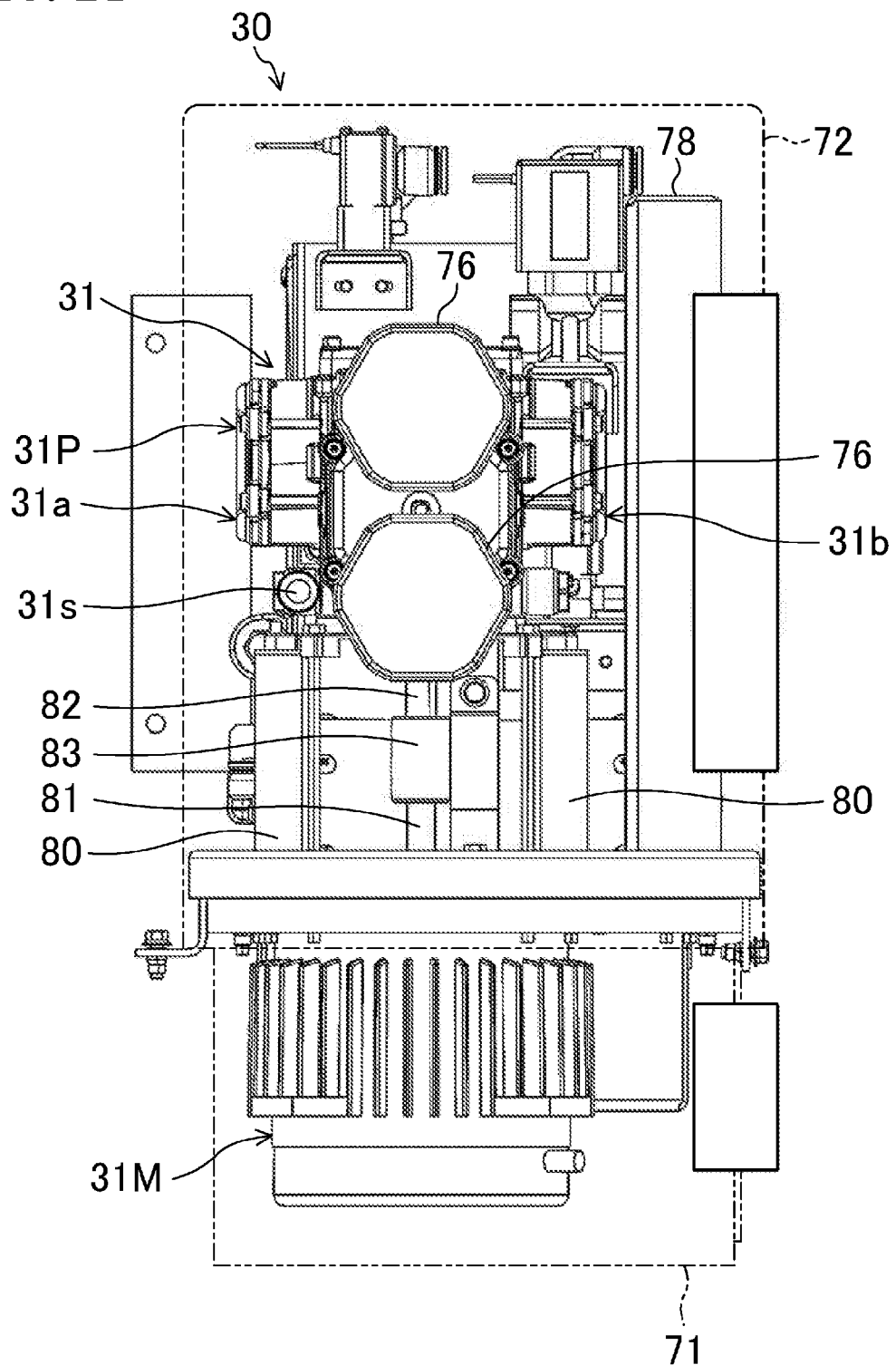
FIG. 21 is a right-side view of the gas mixture supply device according to the third embodiment, and illustrates, with solid lines, how internal components of the gas mixture supply device are arranged.

As illustrated in FIGS. 20 and 21, in the gas mixture supply device (30) of this embodiment, the pump mechanism (31P) is disposed over the support plate (71a) of the unit case (70). Thus, a bracket (80) is attached to the upper surface of the support plate (71a), and the pump mechanism (31P) is fixed to the upper end of the bracket (80).

On the other hand, the motor (31M) is attached to the lower surface of the support plate (71a) with a seal member such as an O ring (not illustrated). An output shaft (81) of the motor (31M) and a drive shaft (82) of the pump mechanism (31P) are disposed so as to face each other on the same axis, and coupled together via a coupling (83). Accordingly, rotation of the motor (31M) causes the pump mechanism (31P) to be driven. As a result, the air that has been sucked into the unit case (70) through the membrane filter (76) is sucked into the pump mechanism (31P), and is used to produce a gas mixture (nitrogen-enriched air).

In the gas mixture supply device (30) of this embodiment, as in the second embodiment, only the motor (31M) functioning as a heat-generating portion is disposed outside the unit case (70). This eliminates the necessity of providing components such as a dedicated blower for cooling the motor (31M). Accordingly, this allows for reducing the cost, and the number of members to provide, and improving the reliability of a motor heat dissipation structure.

In the gas mixture supply device (30) of this embodiment, the respective shafts (81, 82) of the motor (31M) and the pump mechanism (31P) are coupled together via the coupling (83), and the motor (31M) is fixed to the lower surface of the support plate (71a) of the unit case (70) through the O ring. This ensures good sealability for a portion to which the motor (31M) is attached. This also ensures sufficient waterproofness for the unit case (70).

In addition, this embodiment can also achieve the same or similar advantages as/to those of the second embodiment.

Fourth Embodiment

Figure 22:
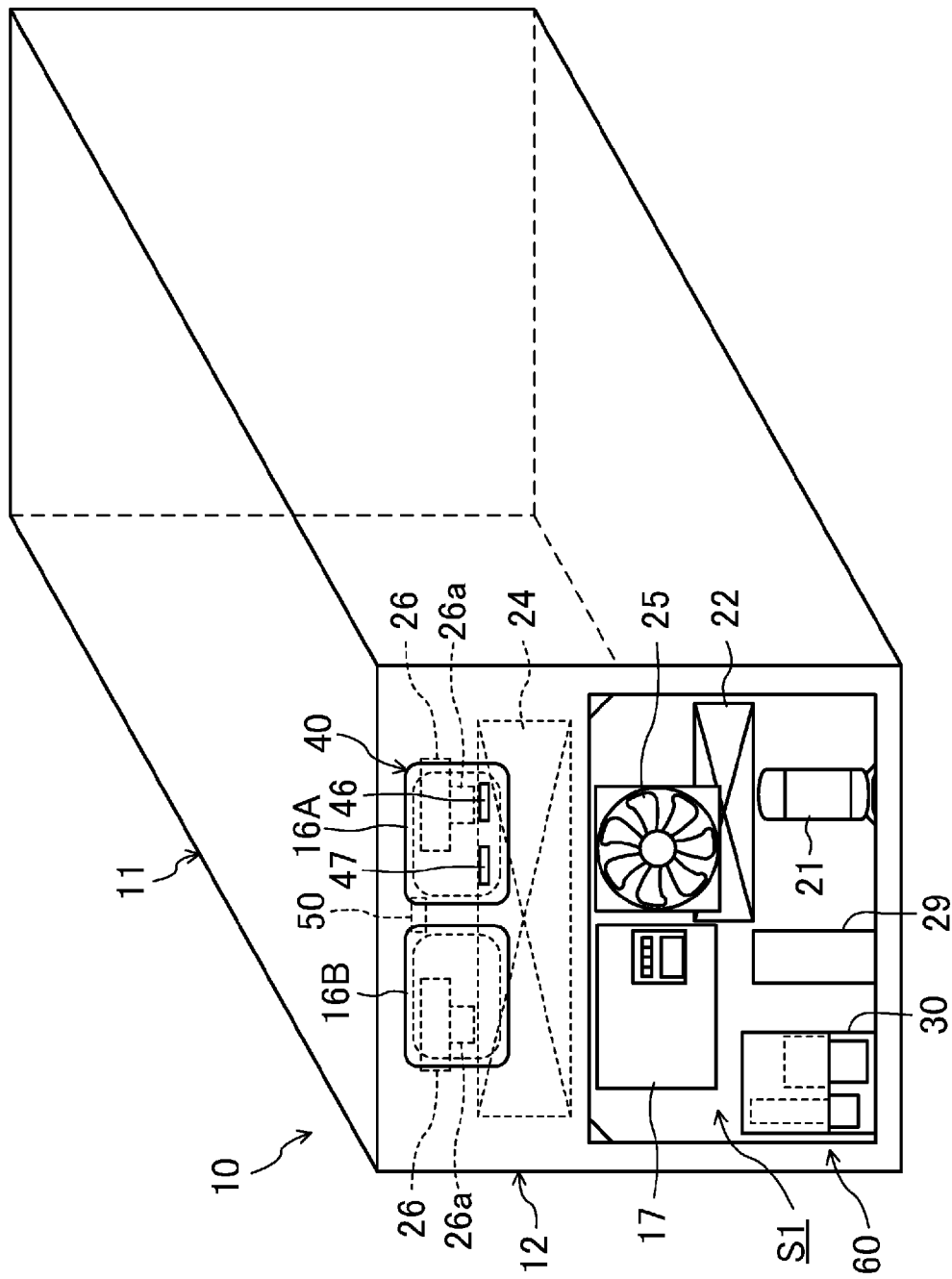
FIG. 22 is a perspective view of a container refrigeration apparatus according to a fourth embodiment, as viewed from the exterior of the container.
Figure 23:
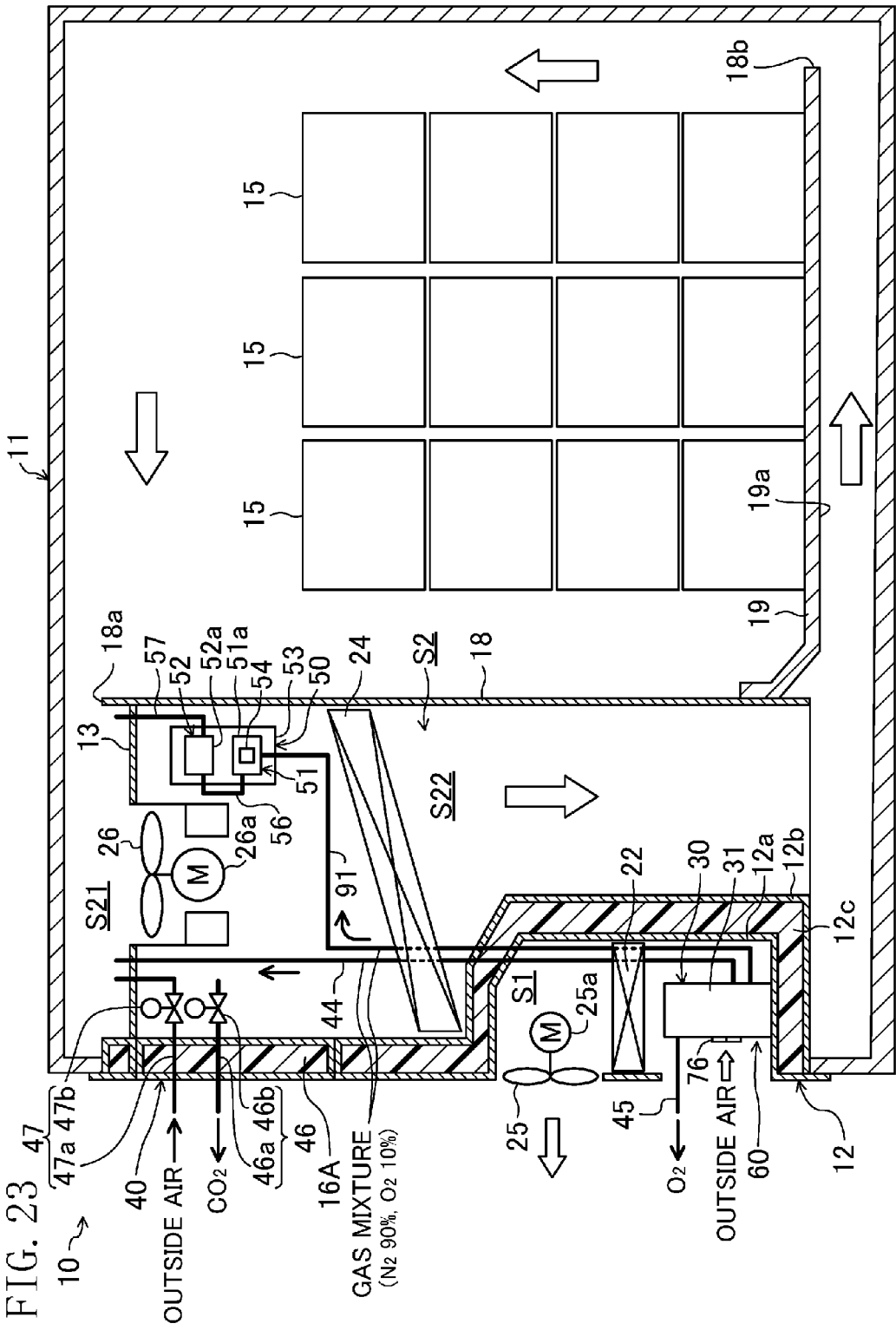
FIG. 23 is a side cross-sectional view illustrating a configuration of the container refrigeration apparatus according to the fourth embodiment.

Next, a fourth embodiment will now be described. As illustrated in FIGS. 22 and 23, the container refrigeration apparatus (10) of this embodiment includes the gas mixture supply device (30), like the container refrigeration apparatus (10) of the second embodiment. The following description will be focused on the difference between the gas mixture supply device (30) of this embodiment and the counterpart (10) of the second embodiment.

In the container refrigeration apparatus (10) of this embodiment, the gas mixture supply device (30), an access door unit (40), a sensor unit (50), a measurement unit (80), and a controller (55) constitute a controlled atmosphere system (CA system) (60). The gas mixture supply device (30), the access door unit (40) and the sensor unit (50) will be described later. The controller (55) is configured to control the oxygen concentration and carbon dioxide concentration of the air in the interior of the container, like the controller (55) of the first embodiment.

Access Door Unit

As illustrated in FIG. 22, in the container refrigeration apparatus (10) of this embodiment, one access door (16A) (on the right side in FIG. 22) is provided with an exhaust portion (46) exhausting the air out of the interior of the container (11), and an intake portion (47) sucking the air from the exterior of the container (11) into the container (11). This access door (16A), the exhaust portion (46), and the intake portion (47) constitute the access door unit (40).

Sensor Unit

In this embodiment, the oxygen concentration detection sensor (51) and the carbon dioxide concentration detection sensor (52) are provided in a single sensor unit (50). The sensor unit (50) is provided in the second space (S22) which is the blowout side of the interior fan (26) in the internal storage space (S2). The sensor unit (50) includes the oxygen concentration detection sensor (51), the carbon dioxide concentration detection sensor (52), a fixing plate (53), a membrane filter (54), a connection pipe (56), and an exhaust pipe (57).

An outer surface of an oxygen sensor box (51a) in which the sensor is housed is fixed to the fixing plate (53). Another outer surface of the oxygen sensor box (51a) opposite from the outer surface fixed to the fixing plate (53) has an opening, to which the membrane filter (54) is attached. A branch pipe (91), which will be described later, is coupled to the lower surface of the oxygen sensor box (51a) through a connector. Furthermore, a connection pipe (56) is coupled to one side surface of the oxygen sensor box (51a) via a connector.

The carbon dioxide concentration detection sensor (52) has a carbon dioxide sensor box (52a), and the connection pipe (56) is coupled to one side surface of the carbon dioxide sensor box (52a) via a connector. Furthermore, the exhaust pipe (57) is coupled to the other side surface of the carbon dioxide sensor box (52a) via a connector.

The membrane filter (54) is a permeable, waterproof filter. This membrane filter (54) allows the second space (S22) of the internal storage space (S2) to communicate with the internal space of the oxygen sensor box (51a), and prevents, when the gas passes from the second space (S22) to the internal space of the oxygen sensor box (51a), moisture in the gas from entering the internal space.

The connection pipe (56) is, as described above, coupled to the one side surface of the oxygen sensor box (51a) and the one side surface of the carbon dioxide sensor box (52a), and allows the internal space of the oxygen sensor box (51a) to communicate with the internal space of the carbon dioxide sensor box (52a).

The exhaust pipe (57) has one end coupled to the other side surface of the carbon dioxide sensor box (52a), as described above, and the other end opened near the suction port of the interior fan (26). In other words, the exhaust pipe (57) allows the internal space of the carbon dioxide sensor box (52a) to communicate with the first space (S21) of the internal storage space (S2).

The second space (S22) and first space (S21) of the internal storage space (S2) communicate with each other through the membrane separator (54), the internal space of the oxygen sensor box (51a), the connection pipe (56), the internal space of the carbon dioxide sensor box (52a), and the exhaust pipe (57). When the interior fan (26) is operated, the pressure of the first space (S21) becomes lower than that of the second space (S22), and thus, the air in the second space (S22) passes through the oxygen concentration detection sensor (51) and the carbon dioxide concentration detection sensor (52) in this order.

Gas Mixture Supply Device

The following description will be focused on the difference between the gas mixture supply device (30) of this embodiment and the counterpart (30) of the second embodiment.

<Piping System of Gas Mixture Supply Device>

Figure 24:
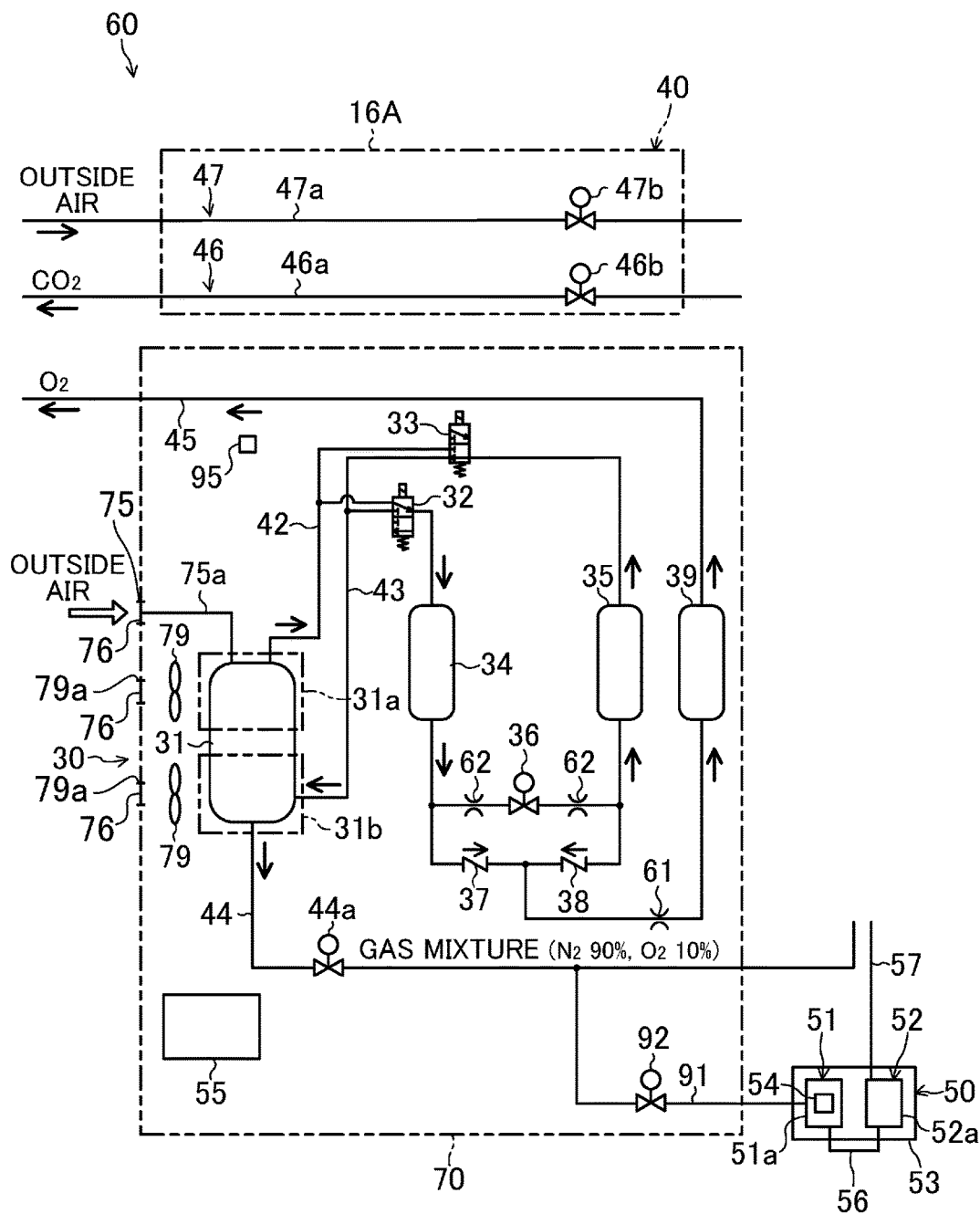
FIG. 24 is a piping system diagram illustrating a configuration of a gas mixture supply device according to the fourth embodiment.

As illustrated in FIG. 24, the gas mixture supply passage (44) of the gas mixture supply device (30) of this embodiment is provided with, instead of the check valve (44a), a solenoid valve (44b) preventing backflow. The gas mixture supply passage (44) has one end connected to the depressurization portion (31b) of the pump mechanism (31P), and the other end opened in the first space (S21) that is the suction side of the interior fan (26) in the internal storage space (S2) of the container (11). The gas mixture (nitrogen-enriched air) that has been sucked into the depressurization portion (31b) of the pump mechanism (31P) is supplied to the interior of the container (11) through the gas mixture supply passage (44).

In the oxygen exhaust passage (45) of the gas mixture supply device (30) of this embodiment, the orifice (61) is disposed between the first and second check valves (37) and (38) and the oxygen tank (39). In this oxygen exhaust passage (45), the check valve (45a) downstream of the oxygen tank (39) is omitted.

In the gas mixture supply device (30) of this embodiment, the branch pipe (91) is connected to the gas mixture supply passage (44). This branch pipe (91) has one end connected to the gas mixture supply passage (44), and the other end coupled to the oxygen sensor box (51a) of the oxygen concentration detection sensor (51). The branch pipe (91) introduces part of the gas mixture (nitrogen-enriched air) passing through the gas mixture supply passage (44) into the oxygen concentration detection sensor (51). Also, the branch pipe (91) is provided with a measurement on-off valve (92). The measurement on-off valve (92) is provided for a portion of the branch pipe (91) in the unit case (70), and opens and closes the branch pipe (91). The opening/closing operation of the measurement on-off valve (92) is controlled by the controller (50).

The rest of the piping system of the gas mixture supply device (30) is the same as that of the second embodiment.

<Mechanical Structure of Gas Mixture Supply Device>

Next, the mechanical structure of the gas mixture supply device (30) will be specifically described with reference to FIGS. 25-30.

Figure 25:
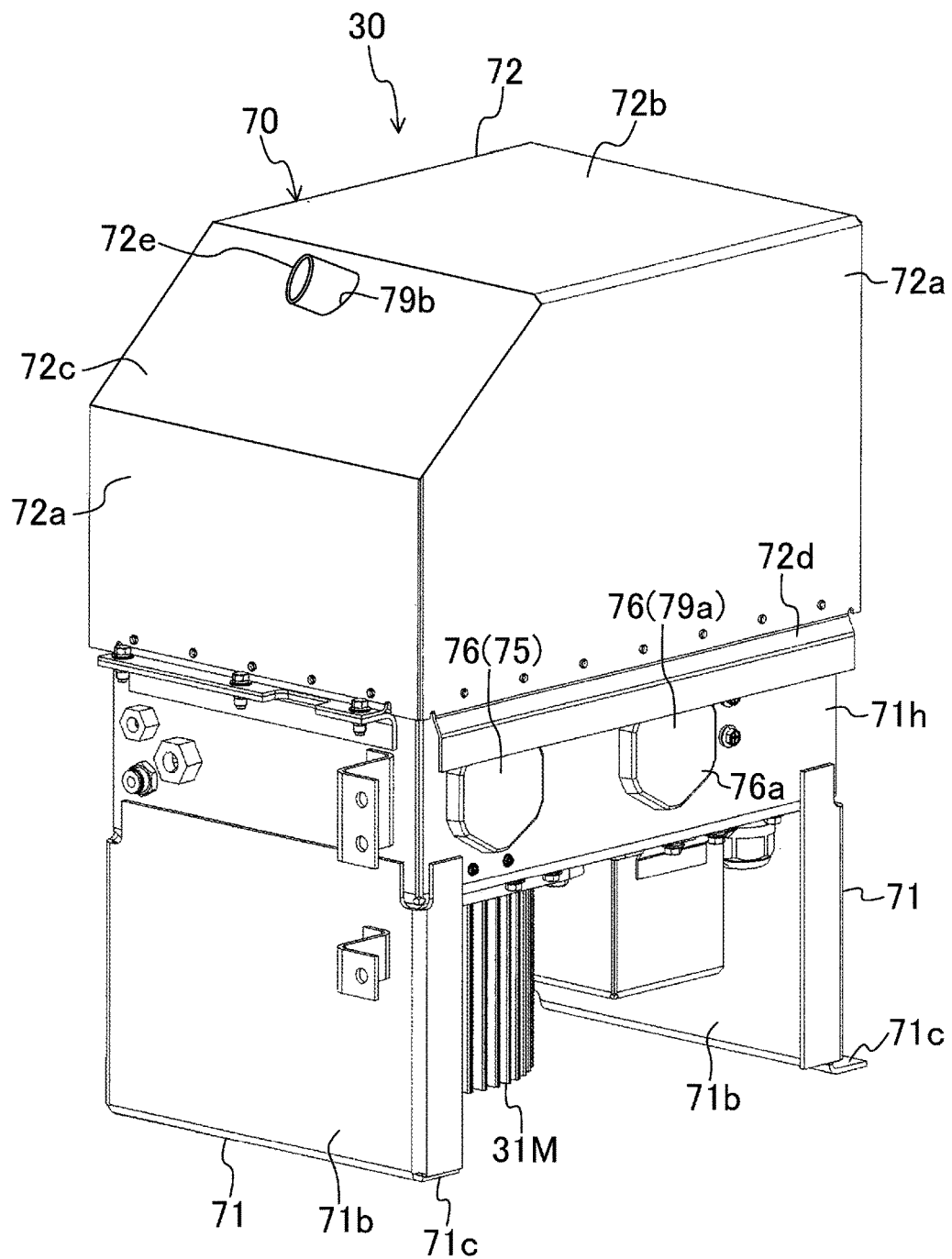
FIG. 25 is a perspective view illustrating an appearance of the gas mixture supply device according to the fourth embodiment.
Figure 26:
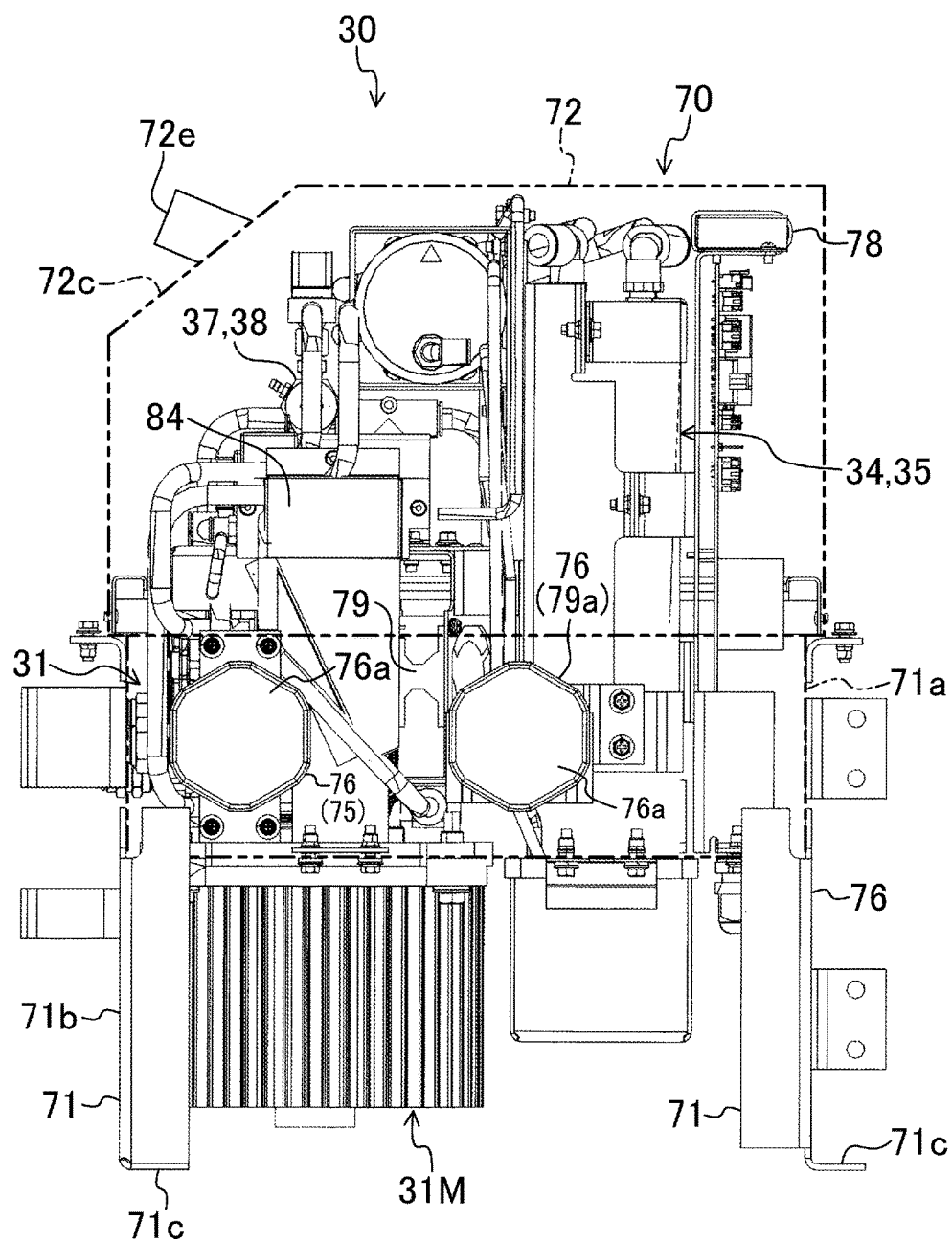
FIG. 26 is a front view of a unit case according to the fourth embodiment, and illustrates, with solid lines, how internal components of the unit case are arranged.
Figure 27:
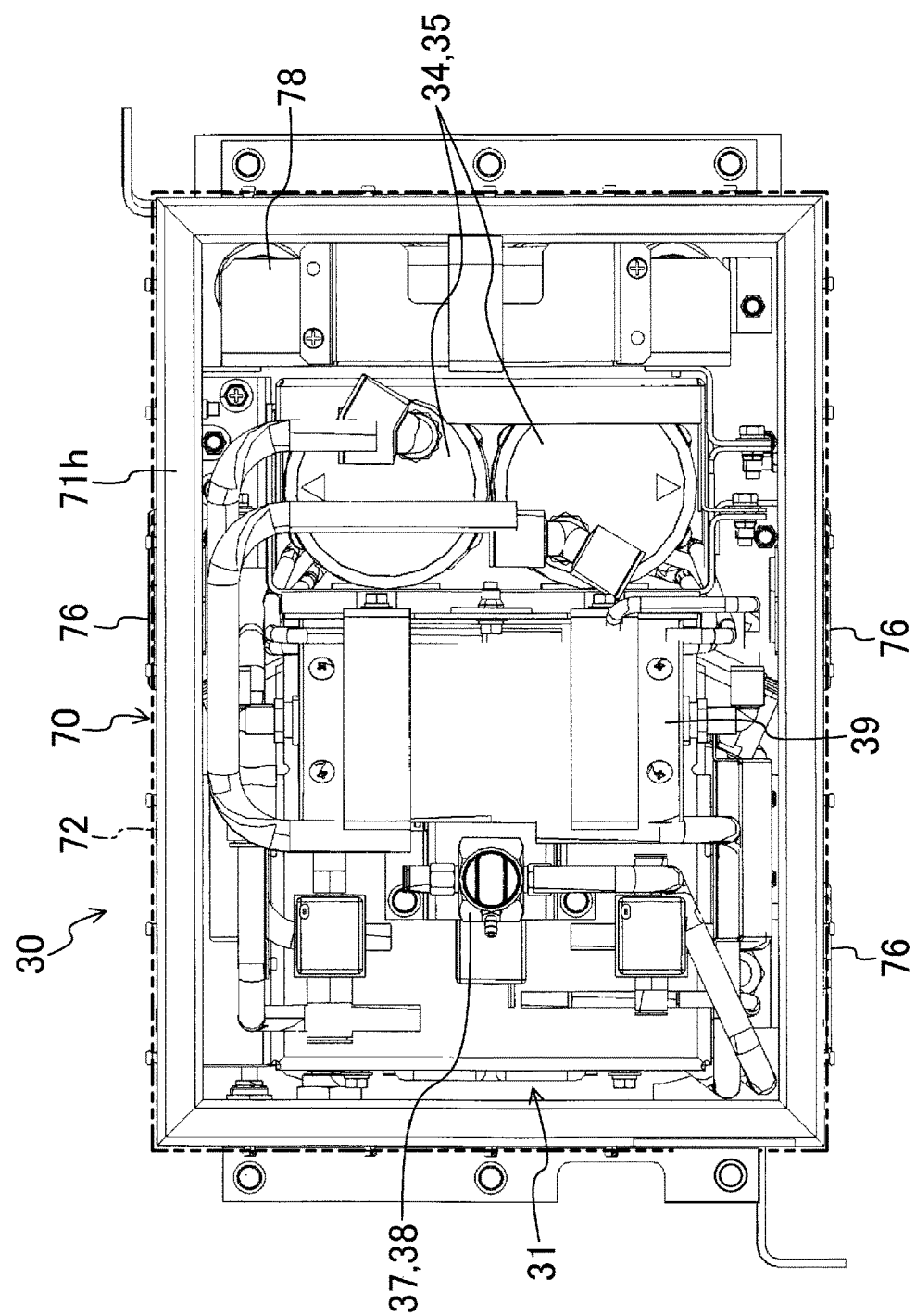
FIG. 27 is a plan view of the unit case according to the fourth embodiment, and illustrates, with solid lines, how internal components of the unit case are arranged.

As illustrated in FIGS. 25 and 26, the unit case (70) includes the base (71) and the cover (72). The base (71) includes, as illustrated in FIGS. 25 and 26, a rectangular cylindrical support (71h) having a bottom and supporting internal components of the gas mixture supply device (30), leg plates (71b) attached to the left or right ends of the support (71a) and extending downward, and attachment plates (71c) each extending from the bottom of an associated one of the leg plates (71b) to the right (to the right when viewed from the front).

The cover (72) has four side plates (72a), and a top panel (72b) closing the respective upper ends of the side plates (72a). One end of the top panel (72b) (i.e., the upper left corner in FIG. 26) is a tilted portion (72c) which is tilted downward and outward from the center of the unit case (70). The tilted portion (72c) is provided with a tube connection (72e) to which a tube (not illustrated) for heat exhaustion is connected. The bottom of the cover (72) is attached to the top of the base (71). In the unit case (70), the space surrounded with the support (71h) and the cover (72) functions as a waterproof, and airtight component housing space.

Figure 30:
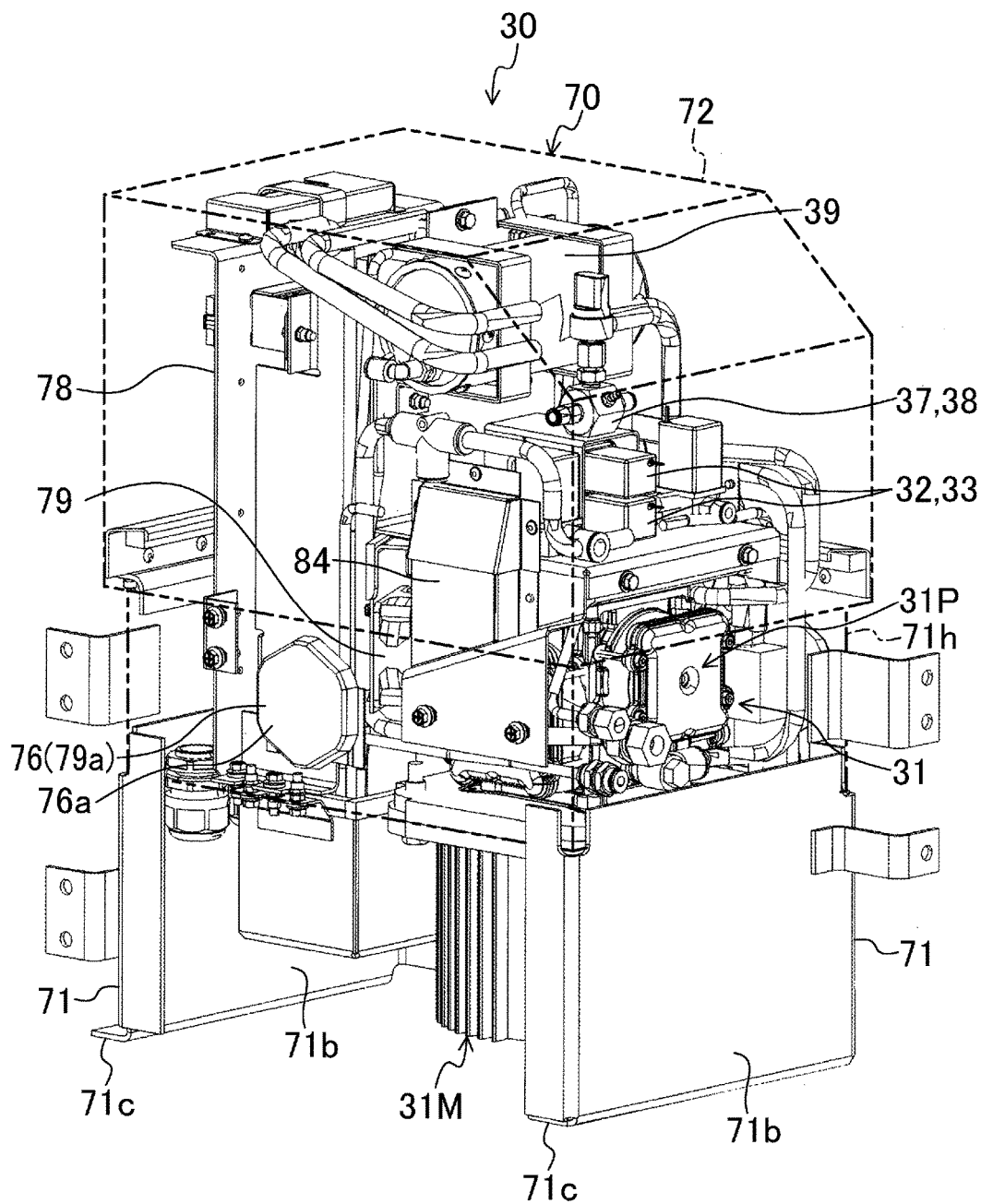
FIG. 30 is a rear perspective view of the unit case according to the fourth embodiment, and illustrates, with solid lines, how internal components of the unit case are arranged.

As illustrated in FIGS. 25 and 30, the front and rear side surfaces of the support (71h) are provided with permeable, waterproof membrane filters (76). The unit case (70) is provided with the air inlet port (75) which allows the pressurization portion (31a) of the pump mechanism (31P) to suck air, as illustrated in FIG. 24. The unit case (70) is also provided with cooling air inlet ports (79a) which allow the cooling fan (79) to suck air into the unit case (70). The air inlet port (75) is provided on the left end of the front side of the support (71h), and the cooling air inlet ports (79a) are provided at the middle of the front and rear sides of the support (71h) (see, e.g., FIGS. 30 and 25). The membrane filters (76) are fitted in these air inlet port (75) and cooling air inlet ports (79a).

The membrane filters (76) are permeable as stated above. Thus, activation of the air pump (31) allows for sucking air through the membrane filters (76). Actuation of the cooling fan (79) allows for sucking air into the unit case (70) through the membrane filters (76). On the other hand, the membrane filter (76) is waterproof and does not allow moisture to pass therethrough. Thus, no moisture enters the case (70).

Figure 28:
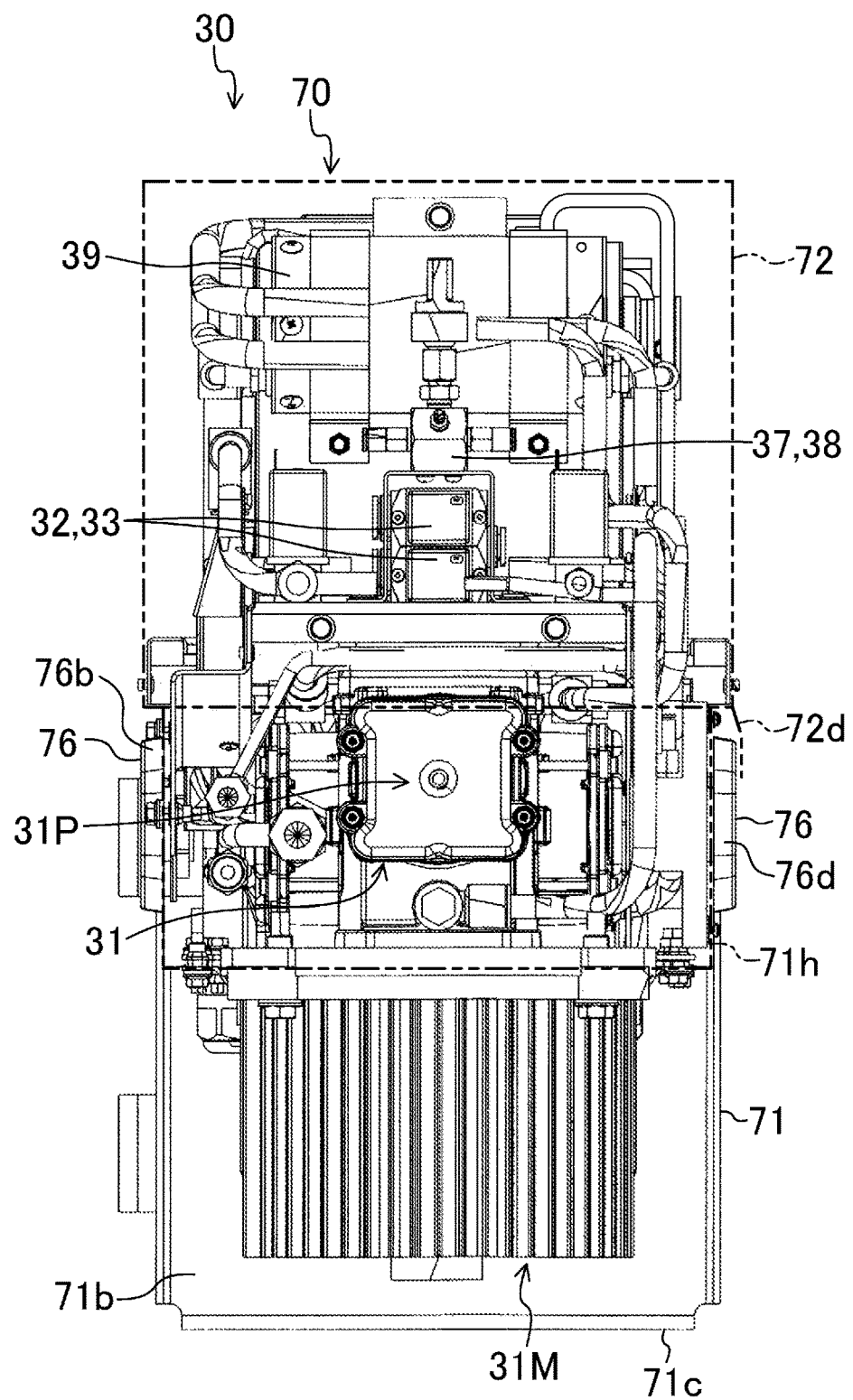
FIG. 28 is a left-side view of the unit case according to the fourth embodiment, and illustrates, with solid lines, how internal components of the unit case are arranged.
Figure 29:
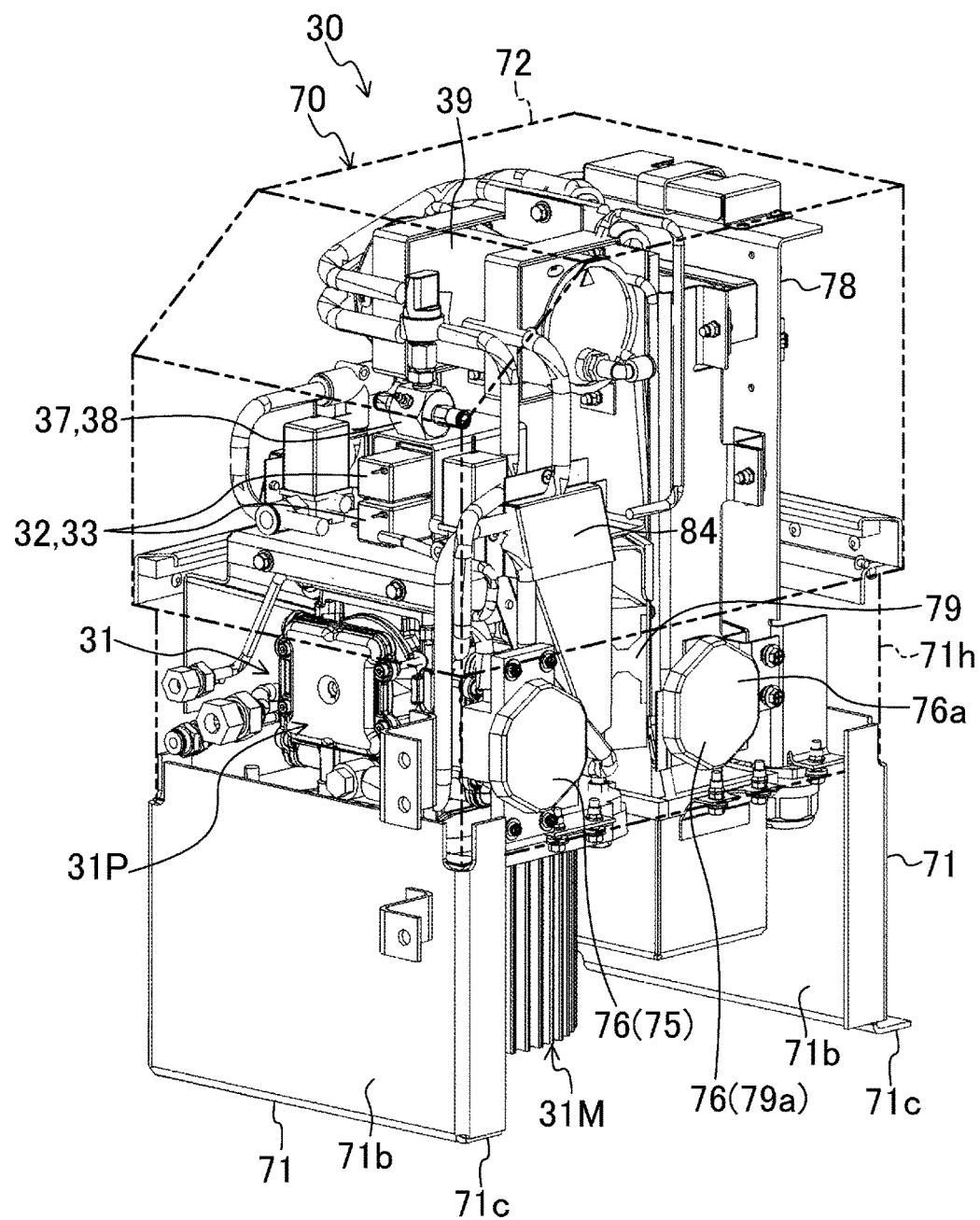
FIG. 29 is a front perspective view of the unit case according to the fourth embodiment, and illustrates, with solid lines, how internal components of the unit case are arranged.

A side surface of the unit case (70) is provided with a filter cover (72d) covering the upper part of the two membrane filters (76) on the front side, as illustrated in FIGS. 25 and 28. This filter cover (72d) prevents the membrane filters (76) from being splashed with sea water from over the case or collecting dust thereon. The filter cover (72d) is provided at the bottom of the front side plate (72a) of the cover (72) so as to tilt outward and extend downward.

As described above, the component housing space for housing the components of the gas mixture supply device (30) is formed in the unit case (70) formed by assembling the base (71) and the cover (72) together. As illustrated in FIGS. 26-30, the unit case (70) is provided with components such as the pump mechanism (31P) of the air pump (31), the two cooling fans (79), the first and second directional control valves (32) and (33), the first and second adsorption columns (34) and (35), the purge valve (36), the first and second check valves (37) and (38), and the oxygen tank (39). The respective components in the unit case (70) are connected together through pipes in accordance with the piping system diagram in FIG. 24. The cover (72) of the unit case (70) is provided with the outlet port of the gas mixture (nitrogen-enriched air) and the outlet port of the oxygen-enriched air.

The pump mechanism (31P) of the air pump (31) is disposed at a position closer to the left end of the internal space of the unit case (70). The first and second adsorption columns (34) and (35) are disposed at a position closer to the right end of the internal space of the unit case (70). The pump mechanism (31P) is disposed under the tilted portion (72c). The motor (31M) of the air pump (31) is attached to the unit case (70) so as to protrude downward from the lower surface of the support (71h). The motor (31M) is located substantially entirely outside the unit case (70).

The cooling fan (79) is disposed near, and provided for, each of the two cooling air inlet ports (79a) on the front and rear sides. Each cooling fan (79) is configured to send the air that has flowed into the unit case (70) through the associated cooling air inlet port (79a) toward the pump mechanism (31P) of the air pump (31) (see FIG. 24).

Part of the air that has been blown out by the cooling fan (79) passes through a branch duct (84) provided in the unit case (70), and is introduced into a space over the pump mechanism (31P). In such a space, i.e., the space under the tilted portion (72c), the electrical components such as the first and second directional control valves (32, 33) are disposed, and are cooled by the air that has flowed out from the branch duct (84). It is recommended to allow about one-third of the air that has been blown out by each cooling fan (79) to flow into the branch duct (84).

The pressurization portion (31a) of the pump mechanism (31P) has the suction port (31s) connected to the air inlet port (75) through a suction pipe (75a; see FIG. 24), and the outlet port (31d) connected to the first and second adsorption columns (34) and (35) through the first and second directional control valves (32) and (33), respectively.

The unit case (70) is provided with, in addition to the air inlet port (75) supplying the air pump (31) with the air, an outlet port (not illustrated) delivering the gas mixture including nitrogen (nitrogen-enriched air) from the first and second adsorption columns (34) and (35). As in the second embodiment, the first and second directional control valves (32) and (33) are provided in the unit case (70). The electrical component module (78) having a control board is disposed on the right side of the first and second adsorption columns (34, 35) in the unit case (70).

Having such a configuration, the gas mixture supply device (30) of this embodiment may be attached later as a separate part to the external storage space (S1) of the container refrigeration apparatus (10). Pipes for supplying the gas mixture (nitrogen-enriched air) to the interior of the container (11) are connected between the gas mixture supply device (30) and the container (11).

This embodiment allows for not only achieving the same or similar advantages as/to those of the second embodiment, but also preventing the membrane filters (76) from being splashed with sea water from over the unit case or collecting dust thereon because the filter cover (72d) covers the membrane filters (76) from over them, and a front cover (86) covers the membrane filters (76) from the front. As a result, the membrane filters (76) may be kept permeable for a long time. This prevents a decrease in pump performance at an earlier stage.

<Adjustment of Switching Time Interval by Controller>

As illustrated in FIG. 24, the gas mixture supply device (30) of this embodiment is provided with an intra-case temperature sensor (95) in the unit case (70). This intra-case temperature sensor (95) measures the temperature of the air (air temperature) inside the unit case (70). The measured value of the intra-case temperature sensor (95) is supplied to the controller (55).

The gas mixture supply device (30) of this embodiment alternately and repeatedly performs the first and second operations for a predetermined period of time (of 15 seconds in this embodiment), as in the first embodiment. The switch between the first and second operations may be made by the controller (55) by having the first and second directional valves (32) and (33) turned at every predetermined switching time interval (of 15 seconds in this embodiment).

The controller (55) of this embodiment is configured such that the higher the measured value of the intra-case temperature sensor (95) is, the shorter the switching time interval is. In other words, the controller (55) of this embodiment is configured to adjust the switching time interval in accordance with the measured value of the intra-case temperature sensor (95).

During the first operation, the pressure in the first adsorption column (34) gradually rises because the pressurization portion (31a) supplies the air to the first adsorption column (34). When the controller (55) switches the first and second directional control valves (32) and (33), the first operation ends, and the second operation begins. Then, the destinations of the air supplied from the pressurization portion (31a) are changed from the first adsorption column (34) to the second adsorption column (35), and thereafter, the pressure in the second adsorption column (35) gradually rises. As can be seen, the pressure of the air supplied from the pressurization portion (31a) to the adsorption columns (34, 35) varies every time a switch is made between the first and second operations.

The longer the duration of each of the first and second operations (i.e., the switching time interval), the higher the pressure of the adsorption columns (34, 35) to which the pressurization portion (31a) supplies the air, and the higher the temperature of the air supplied from the pressurization portion (31a) to the adsorption columns (34, 35). However, if the temperature of the air supplied from the pressurization portion (31a) to the adsorption columns (34, 35) becomes too high, the temperature of the pump mechanism (31P) functioning as the pressurization portion (31a) may be too high to avoid doming damage on the pump mechanism (31P). For example, the grease put on the bearing of the pump mechanism (31P) may melt, resulting in burnout of the bearing. Also, the seal member (e.g., an O ring) ensuring air tightness for the pump mechanism (31P) may deteriorate.

Thus, the controller (55) of this embodiment adjusts the switching time interval in three stages in accordance with the measured value of the intra-case temperature sensor (95). The operation of this controller (55) will now be described.

First, when the air temperature in the unit case (70) is high, the degree of cooling done by the pump mechanism (31P) may be so low that the temperature of the pump mechanism (31P) may be too high. For that reason, if the measured value of the intra-case temperature sensor (95) exceeds the upper limit value (of 80° C.) of the higher temperature range, the controller (55) shortens the switching time interval from 15 seconds to 10 seconds. The shorter the switching time interval is, the shorter the duration of each of the first and second operations is. As the switching time interval is shortened, the pressure of the air supplied from the pressurization portion (31a) of the pump mechanism (31P) to the adsorption columns (34, 35) falls, so does the temperature of the air supplied from the pressurization portion (31a) to the adsorption columns (34, 35). As a result, the temperature of the pump mechanism (31P) is kept low.

If the value measured by the intra-case temperature sensor (95) falls below the lower limit value (of 60° C.) of the higher temperature range while the switching time interval is set to be 10 seconds, the controller (55) resets the switching time interval from 10 seconds to 15 seconds.

Subsequently, when the air temperature in the unit case (70) is low, the degree of cooling done by the pump mechanism (31P) is so high that the temperature of the pump mechanism (31P) is unlikely to become too high. On the other hand, if the temperature of the pump mechanism (31P) is too low, the viscosity of the grease put on the bearing of the pump mechanism (31P) becomes too high. This may cause excessive power consumption of the motor (31M) driving the pump mechanism (31P).

Thus, if the value measured by the intra-case temperature sensor (95) falls below the lower limit value (of 0° C.) of the lower temperature range, the controller (55) extends the switching time interval from 15 seconds to 20 seconds. The longer the switching time interval is, the longer the duration of each of the first and second operations is. As the switching time interval is extended, the pressure of the air supplied from the pressurization portion (31a) of the pump mechanism (31P) to the adsorption columns (34, 35) rises, so does the temperature of the air supplied from the pressurization portion (31a) to the adsorption columns (34, 35). Consequently, the temperature of the air pump (31) rises quickly to reach the proper range soon.

If the value measured by the intra-case temperature sensor (95) exceeds the upper limit value (of 20° C.) of the lower temperature range while the switching time interval is set to 20 seconds, the controller (55) resets the switching time interval from 20 seconds to 15 seconds.

Note that the temperature values and the switching time interval values adopted in the foregoing description of how the controller (55) adjusts the switching time interval are merely examples. Also, the controller (55) of this embodiment may be configured to adjust the switching time interval in two stages, or four or more stages, in accordance with the measured value of the intra-case temperature sensor (95).

Other Embodiments

The above embodiments may be modified in the following manner.

In the embodiments described above, the air pump (31) has the pressurization portion (31a) and the depressurization portion (31b), and the depressurization portion (31b) of the air pump (31) sucks the gas mixture (nitrogen-enriched air). However, a suction pump sucking the gas mixture (nitrogen-enriched air) may be provided separately.

Also, although two adsorption columns, namely, the first and second adsorption columns (34) and (35), are used to adsorb/desorb nitrogen in the embodiments described above, the number of the adsorption columns to use is not limited to two. For example, six adsorption columns may be used as well.

INDUSTRIAL APPLICABILITY

As can be seen from the foregoing description, the present invention is useful for a container refrigeration apparatus having a configuration where a gas mixture including nitrogen is supplied to the interior of the container.

DESCRIPTION OF REFERENCE CHARACTERS

10 Container Refrigeration Apparatus
12 Casing
11 Container
20 Refrigerant Circuit
24 Evaporator
31 Air Pump
31a Pressurization Portion
31b Depressurization Portion
31P Pump Mechanism
31M Motor
32 First Directional Control Valve (Switcher)
33 Second Directional Control Valve (Switcher)

34 First Adsorption Column (First Adsorber)
35 Second Adsorption Column (Second Adsorber)
44 Gas Mixture Supply Passage (Supplier)
55 Controller
70 Unit Case
85 Intra-Case Temperature Sensor
S1 External Storage Space
S2 Internal Storage Space

The invention claimed is:

1. A container refrigeration apparatus which includes a refrigerant circuit performing a refrigeration cycle, and which is attached to a transportable container that stores breathing plants to cool air in the interior of the container, the container refrigeration apparatus comprising:

first and second adsorbers each provided with an adsorbent adsorbing nitrogen in the air;

a pump mechanism equipped with
an air compressor configured to pressurize one of the first and second adsorbers by supplying the one adsorber with the air to perform an adsorption operation of adsorbing nitrogen in the air onto the associated adsorbent; and
an exhaust pump configured to depressurize the other of the first and second adsorbers by sucking the air from the other adsorber to perform a desorption operation of desorbing nitrogen from the associated adsorbent;

first and second air directional control valves which, in combination, alternately switch between a first operation state where the exhaust pump sucks the air from the second adsorber while the air compressor supplies the air to the first adsorber, and a second operation state where the exhaust pump sucks the air from the first adsorber while the air compressor supplies the air to the second adsorber;

a supply passage which supplies the interior of the transportable container with a gas mixture including nitrogen desorbed from the adsorbent; and a casing forming an internal storage space which is connected to the interior of the container and through which air in the interior of the container flows, and an external storage space which is connected to the exterior of the container and through which air in the exterior of the container flows, wherein the first and second adsorbers and the pump mechanism are disposed in the external storage space within an airflow generated to exchange heat with a condenser of the refrigerant circuit, and the container refrigeration apparatus is operative to supply the gas mixture to the interior transportable container while transporting the breathing plants.

2. The container refrigeration apparatus of claim 1, further comprising
a unit case housing the first and second adsorbers and the pump mechanism.

3. The container refrigeration apparatus of claim 2, further comprising:
a motor driving the pump mechanism, wherein
at least part of the motor is disposed outside the unit case.

4. The container refrigeration apparatus of claim 1, wherein
the adsorbent has the property of adsorbing both moisture and nitrogen in air, and
the exhaust pump is configured to suck the air from the first and second adsorbers to desorb both nitrogen and moisture from the respective adsorbents of the first and second adsorbers.

5. The container refrigeration apparatus of claim 1, wherein
the air compressor and the exhaust pump are configured as oil-less pumps.

6. The container refrigeration apparatus of claim 1, further comprising:
a unit case housing at least the air compressor;
an intra-case temperature sensor detecting a temperature in the unit case; and
a controller configured to adjust a time interval at which the first and second air directional control valves switch between the first and second operation states in accordance with a measured valve of the intra-case temperature sensor.

7. The container refrigeration apparatus of claim 1, wherein
in the external storage space are disposed the condenser of the refrigerant circuit and an exterior fan sending the condenser air in the exterior of the container, and
the first and second adsorbers and the pump mechanism are disposed upstream of the condenser in the external storage space in regard to flow of the air from the exterior of the container which is generated by the exterior fan.

* * * * *